US011195236B1

(12) United States Patent
Wang et al.

(10) Patent No.: US 11,195,236 B1
(45) Date of Patent: Dec. 7, 2021

(54) SYSTEMS AND METHODS FOR ANALYZING AND DETERMINING ESTIMATED DATA

(71) Applicant: INTUIT INC., Mountain View, CA (US)

(72) Inventors: Gang Wang, San Diego, CA (US); Kevin M. McCluskey, Carlsbad, CA (US); David A. Hanekamp, Jr., Carlsbad, CA (US); Luis F. Cabrera, Bellevue, WA (US); Per-Kristian Halvorsen, Los Altos Hills, CA (US)

(73) Assignee: INTUIT INC., Mountain View, CA (US)

( * ) Notice: Subject to any disclaimer, the term of this patent is extended or adjusted under 35 U.S.C. 154(b) by 312 days.

(21) Appl. No.: 16/262,698

(22) Filed: Jan. 30, 2019

Related U.S. Application Data

(63) Continuation of application No. 14/555,543, filed on Nov. 26, 2014, now Pat. No. 10,235,722.

(51) Int. Cl.
*G06Q 40/00* (2012.01)
(52) U.S. Cl.
CPC .................. *G06Q 40/123* (2013.12)
(58) Field of Classification Search
CPC ...... G06Q 40/123; G06Q 10/10; G06Q 40/10; G06Q 20/207
See application file for complete search history.

(56) References Cited

U.S. PATENT DOCUMENTS

| 4,213,251 A | 7/1980 | Foundos |
| 4,809,219 A | 2/1989 | Ashford et al. |
| 5,001,006 A | 3/1991 | Saito et al. |

(Continued)

FOREIGN PATENT DOCUMENTS

| JP | 2002/117121 | 4/2002 |
| JP | 2005/190425 | 7/2005 |

(Continued)

OTHER PUBLICATIONS

U.S. Appl. No. 16/154,434, filed Oct. 8, 2018.

(Continued)

*Primary Examiner* — Hao Fu
(74) *Attorney, Agent, or Firm* — DLA Piper LLP (US)

(57) ABSTRACT

Systems, methods and articles of manufacture for analyzing past year tax data for a taxpayer and determining an estimated current year tax liability in order to compute estimated tax payments. The tax preparation system comprises a tax estimate engine configured to access a plurality of calculated past year tax calculation graphs. The tax estimate engine analyzes and compares the calculated past year tax calculation graphs to determine similar node(s) and/or dissimilar node(s) and also determines a similar node estimating value for the similar nodes and/or a dissimilar node estimating value for the dissimilar nodes. A tax calculation engine calculates a current year tax calculation graph using the similar node estimating values and/or dissimilar node estimating values. The calculated current year tax calculation graph includes an estimated tax liability for the current year, which the system uses to compute estimated tax payments for the taxpayer for the current tax year.

26 Claims, 10 Drawing Sheets

(56) References Cited

U.S. PATENT DOCUMENTS

| | | | |
|---|---|---|---|
| 5,006,998 A | 4/1991 | Yasunobu | |
| 5,019,664 A | 5/1991 | Del Rossi et al. | |
| 5,082,144 A | 1/1992 | Sundstrom | |
| 5,417,596 A | 5/1995 | Kusakabe | |
| 5,495,607 A | 2/1996 | Pisello et al. | |
| 5,557,761 A | 9/1996 | Chan et al. | |
| 5,607,353 A | 3/1997 | Hutchings et al. | |
| 5,673,369 A | 9/1997 | Kim | |
| 5,690,854 A | 11/1997 | Bruckner et al. | |
| 5,742,836 A | 4/1998 | Turpin et al. | |
| 5,788,412 A | 8/1998 | Jatkar | |
| 5,813,178 A | 9/1998 | Edwards | |
| 5,819,231 A | 10/1998 | Tremaine et al. | |
| 5,819,249 A | 10/1998 | Dohanich | |
| 6,078,898 A | 6/2000 | Davis | |
| 6,269,355 B1 | 7/2001 | Grimse et al. | |
| 6,334,110 B1 | 12/2001 | Walter et al. | |
| 6,473,741 B1 | 10/2002 | Baker | |
| 6,535,883 B1 | 3/2003 | Lee et al. | |
| 6,601,055 B1 | 7/2003 | Roberts | |
| 6,631,361 B1 | 10/2003 | O'Flaherty et al. | |
| 6,651,217 B1 | 11/2003 | Kennedy | |
| 6,670,969 B1 | 12/2003 | Halstead et al. | |
| 6,690,854 B2 | 2/2004 | Helbing | |
| 6,697,787 B1 | 2/2004 | Miller | |
| 6,850,924 B2 | 2/2005 | Grimse et al. | |
| 6,898,573 B1 | 5/2005 | Piehl | |
| 6,912,508 B1 | 6/2005 | McCalden | |
| 6,925,441 B1 | 8/2005 | Jones et al. | |
| 7,234,103 B1 | 6/2007 | Regan | |
| 7,295,998 B2 | 11/2007 | Kulkarni | |
| 7,331,045 B2 | 2/2008 | Martin et al. | |
| 7,340,679 B2 | 3/2008 | Botscheck et al. | |
| 7,448,022 B1 | 11/2008 | Ram et al. | |
| 7,539,635 B1 | 5/2009 | Peak et al. | |
| 7,565,312 B1 | 7/2009 | Shaw | |
| 7,603,301 B1 | 10/2009 | Regan | |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 | 4/2010 | Burlison et al. | |
| 7,716,094 B1 | 5/2010 | Sutter et al. | |
| 7,742,958 B1 | 6/2010 | Leek | |
| 7,747,484 B2 | 6/2010 | Stanley | |
| 7,761,333 B2 | 7/2010 | Kapp | |
| 7,778,895 B1 | 8/2010 | Baxter | |
| 7,805,349 B2 | 9/2010 | Yu | |
| 7,818,222 B2 | 10/2010 | Allanson et al. | |
| 7,849,405 B1 | 12/2010 | Coletta | |
| 7,860,763 B1 | 12/2010 | Quinn et al. | |
| 7,865,829 B1 | 1/2011 | Goldfield | |
| 7,895,102 B1 | 2/2011 | Wilks et al. | |
| 7,899,757 B1 | 3/2011 | Talan | |
| 7,900,298 B1 | 3/2011 | Char et al. | |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,925,553 B2 | 4/2011 | Banks | |
| 8,001,006 B1 | 8/2011 | Yu et al. | |
| 8,019,664 B1 | 9/2011 | Tifford | |
| 8,082,144 B1 | 12/2011 | Brown et al. | |
| 8,086,970 B2 | 12/2011 | Achtermann et al. | |
| 8,108,258 B1 * | 1/2012 | Slattery | G06Q 40/123 705/19 |
| 8,109,499 B2 | 2/2012 | Griese et al. | |
| 8,126,820 B1 | 2/2012 | Talan | |
| 8,190,499 B1 | 5/2012 | McVickar | |
| 8,204,805 B2 | 6/2012 | Eftekhari et al. | |
| 8,224,726 B2 | 7/2012 | Murray | |
| 8,234,562 B1 | 7/2012 | Evans | |
| 8,244,607 B1 | 8/2012 | Quinn | |
| 8,306,885 B2 | 11/2012 | Brose | |
| 8,346,635 B1 | 1/2013 | Olim | |
| 8,346,680 B2 | 1/2013 | Castleman | |
| 8,370,795 B1 | 2/2013 | Sage | |
| 8,386,344 B2 | 2/2013 | Christina | |
| 8,407,113 B1 | 3/2013 | Eftekhari et al. | |
| 8,417,596 B1 | 4/2013 | Dunbar et al. | |
| 8,417,597 B1 | 4/2013 | McVickar | |
| 8,447,667 B1 | 5/2013 | Dinamani et al. | |
| 8,452,676 B1 | 5/2013 | Talan | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Olim | |
| 8,560,409 B2 | 10/2013 | Abeles | |
| 8,583,516 B1 | 11/2013 | Pitt et al. | |
| 8,589,262 B1 | 11/2013 | Wang | |
| 8,607,353 B2 | 12/2013 | Rippert | |
| 8,635,127 B1 | 1/2014 | Shaw | |
| 8,639,616 B1 | 1/2014 | Rolenaitis | |
| 8,682,756 B1 | 3/2014 | Tifford et al. | |
| 8,682,829 B2 | 3/2014 | Barthel | |
| 8,694,395 B2 | 4/2014 | Houseworth | |
| 8,706,580 B2 | 4/2014 | Houseworth | |
| 8,732,057 B1 | 5/2014 | Becker | |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 8,892,467 B1 | 11/2014 | Ball | |
| 8,930,253 B1 | 1/2015 | Ball | |
| 8,949,270 B2 | 2/2015 | Newton et al. | |
| 9,372,687 B1 | 6/2016 | Pai | |
| 9,406,089 B2 | 8/2016 | Mori | |
| 9,690,854 B2 | 6/2017 | Stent et al. | |
| 9,760,953 B1 | 9/2017 | Wang et al. | |
| 9,916,628 B1 | 3/2018 | Wang et al. | |
| 9,922,376 B1 | 3/2018 | Wang et al. | |
| 9,990,678 B1 | 6/2018 | Cabrera et al. | |
| 10,580,089 B2 | 3/2020 | Mori | |
| 10,614,526 B2 | 4/2020 | Mori | |
| 2002/0023064 A1 | 2/2002 | Grimse et al. | |
| 2002/0065831 A1 | 5/2002 | DePaolo | |
| 2002/0107698 A1 | 8/2002 | Brown et al. | |
| 2002/0107824 A1 | 8/2002 | Ahmed | |
| 2002/0111888 A1 | 8/2002 | Stanley et al. | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0126054 A1 | 7/2003 | Purcell | |
| 2003/0139827 A1 | 7/2003 | Phelps | |
| 2003/0174157 A1 | 9/2003 | Hellman | |
| 2003/0182102 A1 | 9/2003 | Corston-Oliver et al. | |
| 2004/0002906 A1 | 1/2004 | Von Drehnen et al. | |
| 2004/0019540 A1 | 1/2004 | William | |
| 2004/0019541 A1 | 1/2004 | William | |
| 2004/0021678 A1 | 2/2004 | LIllah et al. | |
| 2004/0078271 A1 | 4/2004 | Morano | |
| 2004/0083164 A1 | 4/2004 | Schwartz et al. | |
| 2004/0088233 A1 | 5/2004 | Brady | |
| 2004/0117395 A1 | 6/2004 | Gong | |
| 2004/0172347 A1 | 9/2004 | Barthel | |
| 2004/0181543 A1 | 9/2004 | Wu et al. | |
| 2004/0205008 A1 | 10/2004 | Haynie et al. | |
| 2005/0171822 A1 | 8/2005 | Pagan | |
| 2005/0192823 A1 | 9/2005 | Kuhn et al. | |
| 2005/0216379 A1 | 9/2005 | Ozaki | |
| 2005/0262191 A1 | 11/2005 | Mamou et al. | |
| 2006/0112114 A1 | 5/2006 | Yu | |
| 2006/0155618 A1 | 7/2006 | Wyle | |
| 2006/0155632 A1 | 7/2006 | Pherkas et al. | |
| 2006/0178961 A1 | 8/2006 | Stanley et al. | |
| 2006/0245369 A1 | 11/2006 | Schimmelpfeng | |
| 2006/0282354 A1 | 12/2006 | Varghese | |
| 2006/0293990 A1 | 12/2006 | Schaub | |
| 2007/0011036 A1 | 1/2007 | Lo | |
| 2007/0033116 A1 | 2/2007 | Murray | |
| 2007/0033117 A1 | 2/2007 | Murray | |
| 2007/0033130 A1 | 2/2007 | Murray | |
| 2007/0055571 A1 | 3/2007 | Fox et al. | |
| 2007/0094207 A1 | 4/2007 | Yu et al. | |
| 2007/0136157 A1 | 6/2007 | Neher et al. | |

(56) References Cited

U.S. PATENT DOCUMENTS

| | | |
|---|---|---|
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0071673 A1 | 3/2008 | Howard |
| 2008/0097878 A1 | 4/2008 | Abeles |
| 2008/0126170 A1 | 5/2008 | Leek et al. |
| 2008/0141247 A1 | 6/2008 | Saravanan |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0112807 A1 | 4/2009 | Bahn |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0057659 A1 | 3/2010 | Phelon et al. |
| 2010/0063981 A1 | 3/2010 | Thomsen |
| 2010/0088124 A1 | 4/2010 | Diefendori et al. |
| 2010/0131394 A1 | 5/2010 | Rutsch et al. |
| 2010/0153138 A1 | 6/2010 | Evans |
| 2010/0161379 A1 | 6/2010 | Bene et al. |
| 2010/0179916 A1 | 7/2010 | Johns et al. |
| 2011/0004537 A1 | 1/2011 | Allanson et al. |
| 2011/0078062 A1 | 3/2011 | Kleyman |
| 2011/0099063 A1 | 4/2011 | Clemmons |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth et al. |
| 2012/0005209 A1 | 1/2012 | Rinearson et al. |
| 2012/0016817 A1 | 1/2012 | Smith et al. |
| 2012/0027246 A1 | 2/2012 | Tifford et al. |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari et al. |
| 2012/0109793 A1 | 5/2012 | Abeles |
| 2012/0136764 A1 | 5/2012 | Miller et al. |
| 2012/0173295 A1 | 7/2012 | Phelon et al. |
| 2012/0215669 A1 | 8/2012 | Lieberman et al. |
| 2012/0278365 A1 | 11/2012 | Labat et al. |
| 2012/0296768 A1 | 11/2012 | Fremont-Smith et al. |
| 2012/0323749 A1 | 12/2012 | Lapidus |
| 2013/0036347 A1 | 2/2013 | Eftekhari et al. |
| 2013/0046603 A1 | 2/2013 | Grigg et al. |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula et al. |
| 2014/0108213 A1 | 4/2014 | Houseworth |
| 2014/0149303 A1 | 5/2014 | Band |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1* | 3/2016 | Goldman ............ G06Q 40/123 705/31 |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014/206960 | 10/2014 |
| KR | 10-2012-0011987 | 2/2012 |
| WO | WO 2017/004094 | 1/2017 |
| WO | WO 2017/004095 | 1/2017 |
| WO | WO 2017/019233 | 2/2017 |
| WO | WO 2017/116496 | 7/2017 |
| WO | WO 2017/116497 | 7/2017 |
| WO | WO 2018/022023 | 2/2018 |
| WO | WO 2018/022128 | 2/2018 |
| WO | WO 2018/080562 | 5/2018 |
| WO | WO 2018/080563 | 5/2018 |

OTHER PUBLICATIONS

U.S. Appl. No. 16/502,863, filed Jul. 3, 2019.
U.S. Appl. No. 14/448,962, filed Jul. 31, 2014.
U.S. Appl. No. 16/266,754, filed Feb. 4, 2019.
U.S. Appl. No. 14/448,922, filed Jul. 31, 2014.
hittp://en.wikipedia.org/wiki/Loose_coupling, printed Mar. 11, 2014, 2 pages.
hittp://www.webopedia.corniTERM/Uloose_coupling.html, printed March 11, 2014, 4 pages
http://doc.jboss.org/drools/release/5.3.0.Final/drools-expert-docs/html/ch01.html, printed Mar. 11, 2014, 10 pages.
http://en.wikipedia.org/wiki/Declarative_programming, printed Mar. 11, 2014, 4 pages.
http://en.wikipedia.org/wiki/Drools, printed Mar. 11, 2014, 4 pages.
http://quicken.intuit.com/support/help/income-and-expenses/how-to-assign-tax-form-line-items-to-a-category/GEN82142.html, updated Aug. 11, 2011, printed Jun. 24, 2014, 2 pages.
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014, 2 pages.
http://quicken.intuit.com/support/help/tax-savings/simplify-tax-time/INF24047.html, updated Jul. 25, 2013, printed Jun. 24, 2014, 11 pages.
http://www.jboss.org/drools/drools-expert.html, printed Mar. 11, 2014, 5 pages.
https://turbotax.intuit.com/snaptax/mobile/, printed Mar. 11, 2014, 2 pages.
NY State Dep of Taxation, NY State Personal Income Tax MeF Guide for Software Developers, 2012, NY State, 30 pages.
OpenRules, Preparing a Tax Return Using OpenRules Dialog, Aug. 2011, 25 pages.

(56) References Cited

OTHER PUBLICATIONS

Wikipedia, https://en.Wikipedia.org/wikaree_(data_structure), "Tree (data structure)", May 15, 2005, 1 page.
Wikipedia, https://en.wikipedia.org/wiki/Data_structure, "Data Structures", Jan. 12, 2012, 1 page.
Vanderbilt University, "Free tax prep help available for Vanderbilt employees", Feb. 6, 2014, Vanderbilt University, p. 1-3 [NPL-1].
http://www.wisegeek.com/what-is-declarative-programming.htm, printed Mar. 11, 2014, 2 pages.
https://developers.facebook.com/docs/marketing-api/overview, printed Feb. 6, 2015, 5 pages.
https://developers.facebook.com/docs/marketing-apis, printed Feb. 6, 2015, 3 pages.
https://developers.facebook.com/docs/marketing-apis/using-the-api, printed Feb. 6, 2015, 2 pages.
H.R. Gregg; Decision Tables for Documentation and System Analysis; Oct. 3, 1967; Union Carbide Corporation, Nuclear Division, Computing Technology Center: (Year: 1967), 25 pages.
Solomon L. Pollack; Analysis of the Decision Rules in Decision Tables, May 1963; The Rand Corporation, 78 Pages.
U.S. Appl. No. 13/923,266, filed June 20, 2013
U.S. Appl. No. 14/462,345, filed Jul. 31, 2014.
U.S. Appl. No. 14/448,986, filed Jul. 31, 2014.
U.S. Appl. No. 14/555,543, filed Nov. 26, 2014.
U.S. Appl. No. 14/555,334, filed Nov. 26, 2014.
U.S. Appl. No. 14/555,296, filed Nov. 26, 2014.
U.S. Appl. No. 14/673,646, filed Mar. 30, 2015.
U.S. Appl. No. 14/555,222, filed Nov. 26, 2014.
U.S. Appl. No. 14/701,087, filed Apr. 30, 2015.
U.S. Appl. No. 16/148,506, filed Oct. 1, 2018.
U.S. Appl. No. 16/188,442, filed Nov. 13, 2018.
U.S. Appl. No. 16/154,434, filed Oct. 8, 2018 dated Sep. 1, 2021 (Jun. 2, 2021-present).
U.S. Appl. No. 16/148,506, filed Oct. 1, 2018 dated Sep. 1, 2021 (Jun. 2, 2021-present).
Zhang, "Enabling Personalization Recommendation with Weighted FP for Text Information Retrieval Based on User-Focus", Proceedings of the International Conference on Information Technology: Coding and Computing (ITCC'04), 2004, 5 pages,.
U.S. Appl. No. 16/188,442, filed Nov. 13, 2018 dated Nov. 2, 2021 (Sep. 2, 2021- present).

\* cited by examiner

FIG. 4

| | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule$_1$ | Y | ? | ? | ? | N | ? | ? | 40% | 10% |
| Rule$_2$ | N | Y | Y | ? | ? | ? | N | 20% | 5% |
| Rule$_3$ | N | Y | N | Y | ? | N | ? | 14% | 6% |
| Rule$_4$ | Y | ? | ? | ? | N | Y | N | 65% | 20% |
| Rule$_5$ | N | Y | N | ? | ? | ? | Y | 18% | 40% |
| Rule$_6$ | Y | Y | N | ? | ? | N | ? | 5% | 25% |

FIG. 5

SYSTEMS AND METHODS FOR ANALYZING AND DETERMINING ESTIMATED DATA

CROSS-REFERENCE TO RELATED APPLICATIONS

This application is a Continuation of U.S. patent application Ser. No. 14/555,543 filed Nov. 26, 2014, now issued as U.S. Pat. No. 10,235,722, the entirety of which is incorporated herein by reference.

SUMMARY

Embodiments of the present invention are directed to computerized systems and methods for determining estimated tax payments to be paid by a taxpayer, and more particularly to systems and methods for analyzing expected tax liabilities based on previously filed tax returns and determining estimated tax payment.

The embodiments of the present invention may be implemented on and/or utilizing a tax return preparation system, or components thereof, comprising a tax preparation software application executing on a computing device. The tax return preparation system may operate on a new construct in which tax rules and the calculations based thereon are established in declarative data-structures, namely, completeness graph(s) and tax calculation graph(s). The tax calculation graph(s) comprise a plurality of nodes including input nodes, functional nodes, and function nodes. The tax calculation graph(s) are also configured with a plurality of calculation paths wherein each calculation path connects a plurality of nodes which are data dependent such that a node is connected to another node if the node depends on the other node. Use of these data-structures permits the user interface to be loosely connected or even divorced from the tax calculation engine and the data used in the tax calculations. Tax calculations are dynamically calculated based on tax-related data that is input from a user, derived from sourced data, or estimated. A smart tax logic agent running on a set of rules can review current run time data and evaluate missing tax data necessary to prepare and complete a tax return. The tax logic agent proposes suggested questions to be asked to a user to fill in missing blanks. This process can be continued until completeness of all tax topics has occurred. A completed tax return (e.g., a printed tax return or an electronic tax return) can then be electronically prepared and filed (electronically and/or in paper form) with respect to the relevant taxing jurisdictions.

In another aspect of the tax return preparation system, the system is configured to operate the computing device to establish a connection to a data store configured to store user-specific tax data therein. The computing device executes a tax calculation engine configured to read and write tax calculation data to and from the shared data store, the tax calculation engine using one or more of the tax calculation graphs specific to particular tax topics. The computing device executes a tax logic agent, the tax logic agent reading from the shared data store and a plurality of decision tables collectively representing a completion graph for computing tax liability or a portion thereof, the tax logic agent outputting one or more suggestions for missing tax data based on an entry in one of the plurality of decision tables. The computing device executes a user interface manager configured to receive the one or more suggestions and present to a user one or more questions based on the one or more suggestions via a user interface, wherein a user response to the one or more questions is input to the shared data store. The user interface manager is configured to generate and display a question screen to the user. The question screen includes a question for the user requesting tax data and is also configured to receive the tax data from the user in the form of input from the user. The user interface manager which receives the suggestion(s) selects one or more suggested questions to be presented to a user. Alternatively, the user interface manager may ignore the suggestion(s) and present a different question or prompt to the user.

In the event that all tax topics are covered, the tax logic agent, instead of outputting one or more suggestions for missing tax data may output a "done" instruction to the user interface manager. The computing device may then prepare a tax return based on the data in the shared data store. The tax return may be a conventional paper-based return or, alternatively, the tax return may be an electronic tax return which can then be e-filed.

The tax preparation system may also be configured to determine and provide an estimate of estimated tax payments during a current tax year. Under federal tax law for federal income taxes, and state or local law for state or local income taxes, taxpayers are typically required to make estimated tax payments during the current tax year as income is earned. Estimated tax payments may be in the form of withholding tax payments withheld by employers or other income payers from a taxpayer's salary or other payments, or estimated periodic tax payments (e.g. federal quarterly estimated tax payments) payable by the taxpayer directly to the governing tax agency. These estimated tax payments must be made based on an estimate of the amount of tax the taxpayer will incur because they are made before the current tax year has ended and/or before the taxpayer has completed a tax return determining the actual amount of tax liability. If therefore follows that the estimated tax payments typically must be made based on an estimate of the underlying tax data upon which the taxpayer's tax liability will be based, such as income, deductions, adjusted gross income, qualifying tax credits. etc.

Accordingly, in one embodiment of the present invention, the tax preparation system (or at required components thereof) is configured to analyze a taxpayer's expected tax liability and to determine estimated tax payments for the taxpayer for a current tax year. The tax preparation software application further comprises a current year tax calculation graph and at least one of (i) a plurality of past year tax calculation graphs for each of a plurality of past years or (ii) a plurality of calculated past year tax calculation graphs which are the result of the tax calculation engine calculating each of the past year tax calculation graphs based on respective past year tax data for the taxpayer for each of the past years, and a tax estimate engine.

The tax preparation software application further comprises a tax estimate engine. The tax estimate engine is configured to determine which tax values from past years have not changed significantly, such that these tax values can be used to calculate an accurate estimate of the taxpayer's tax liability for the current year with a reasonable confidence level of its accuracy. Thus, the tax estimate engine is configured to analyze and compare the calculated past year tax calculation graphs to determine one or more similar node(s) having values which are within a similar range among the calculated past year tax calculation graphs. The similar range may be a particular magnitude, such as within some dollar amount or range of magnitude, or a percentage, such as within X %, or other suitable measure of similarity. The tax estimate engine then determines a similar node estimating value for one or more of the similar nodes based on the values of the similar nodes on the calculated past year tax calculation graphs. For example, the similar node estimating value may be an average of the values of the respective node from each of the calculated past year tax calculation graphs, or the value that will result in the highest or lowest tax liability (the highest tax liability providing a pessimistic or conservative estimate and the lowest tax liability providing an optimistic estimate).

To calculate an estimate of tax liability for the current tax year, the tax estimate engine provides the similar node estimating values to the tax calculation engine to calculate the current year tax calculation graph using the similar node estimating values. As an example, the similar nodes may be determined to be the taxpayer's income, total deductions, adjusted gross income, and tax credits. In many cases, these tax values will yield a reasonably accurate estimate of tax liability for the current year. The calculation of the current year tax calculation graph results in a calculated current year tax calculation graph including an estimated tax liability for the current year. The tax preparation system then computes estimated tax payments for the taxpayer based on the estimated tax liability. The estimated tax payments may be in the form of withholding tax payments, or estimated tax payments (e.g. quarterly estimated tax payments), or other suitable tax payments.

In another aspect of the present invention, the tax estimate engine may also be configured to analyze and compare each of the calculated past year tax calculation graphs to determine one or more dissimilar node(s) having values which are outside a dissimilar range among the past year tax calculation graphs. The dissimilar range may be a particular magnitude, such as outside some dollar amount or range of magnitude, or a percentage, such as outside X %, or other suitable measure of dissimilarity. The tax estimate engine then determines a dissimilar node estimating value for one or more of the dissimilar nodes. The dissimilar estimating value may be determined such that the chosen value will result in a same or higher tax liability (to obtain a pessimistic estimate of tax liability), or same or lower tax liability (to obtain an optimistic estimate of tax liability), than each of the values on any of the calculated past year tax calculation graphs. The tax estimate engine provides the dissimilar node estimating value(s) to the tax calculation engine to calculate the current year tax calculation graph using both the similar node estimating values and the dissimilar node estimating values. This results in a calculated current year tax calculation graph including an estimated tax liability for the current year. Same as above, the tax preparation system then computes estimated tax payments for the taxpayer based on the estimated tax liability.

In another aspect, the tax preparation system and tax estimate engine may be configured to determine the similar node estimating values and/or dissimilar estimating values by requesting the values from the user of the system. As an example, the system may present the similar node estimating values and/or dissimilar estimating values determined by the tax estimate engine to the user and request the user to confirm that the values are suitable for determining estimated tax payments for the current year, or to modify the values through a suitable user interface, such as the one of those available from the user interface manager. The system then receives the modified estimating values, if any, and utilizes the modified estimating values as the respective similar node estimating values and/or dissimilar estimating values.

In another aspect of the present invention, the tax estimate engine may also be configured to determine that a reasonably accurate estimate of tax liability for the current year cannot be calculated based on the tax data currently available to the system, including the similar node estimating values and the dissimilar node estimating values. For instance, the tax estimate engine may determine that the taxpayer's income varied significantly during the past years, and therefore, it cannot assign a similar node estimating value for income. The tax estimate engine is configured to determine estimating tax data needed to provide an accurate estimate of tax liability for the current year. The tax preparation software application is configured to access the estimating tax data, such as be requesting the estimating tax data from a user, or accessing a remotely located user-specific data source and automatically importing tax data related to the estimating tax data. The tax estimate engine uses the estimating tax data to determine an estimating value to be used to calculate the current year tax calculation graph and determine the estimated tax liability and estimated tax payments for the taxpayer.

In another aspect of the invention, the system may be configured to determine the one or more similar node(s) and/or dissimilar node(s) by traversing each of the calculated past year tax calculation graphs and comparing the values for the respective calculated tax calculation graphs at corresponding nodes. This may be done node by node from the bottom-up through the tax calculation graph (e.g. starting at the first node), or from the top-down through the calculation graph (e.g. starting at a changed input node).

In another aspect of the invention, the tax preparation system may utilize impact chains to determine similar node(s) and/or dissimilar node(s) between the calculated past year tax calculation graphs. An impact chain is a sequence of interdependent nodes within a tax calculation graph. Accordingly, an impact chain for a respective node of a calculation graph consists of one of (a) each of the other nodes which are affected by the respective node (e.g. a top-down traverse of the calculation graph commencing with the respective node), or (b) each of the other nodes which affect the respective node (e.g. a bottom-up traverse of the calculation graph commencing with the respective node).

Another embodiment of the present invention is directed to computer-implemented methods for determining estimated tax payments for a taxpayer for a current tax year. For example, the method may include, a tax preparation system, same or similar to that described above, executing the tax estimate engine to access a plurality of calculated past year tax calculation graphs which are the result of calculating each of the past year tax calculation graphs based on respective past year tax data for the taxpayer for each of the past years. The tax estimate engine analyzes and compares each of the past year tax calculation graphs to determine one or more similar node(s) having values which are within a similar range among the past year tax calculation graphs. The tax estimate engine determines a similar node estimating value for one or more of the similar nodes based on the values of the similar nodes on the calculated past year tax calculation graphs. The tax estimate engine provides the similar node estimating values to the tax calculation engine. Then, the tax calculation engine calculates the current year tax calculation graph using the similar node estimating values resulting in a calculated current year tax calculation graph including an estimated tax liability for the current year. Finally, the tax estimate engine computes estimated tax payments for the taxpayer based on the estimated tax liability.

In additional aspects of the present invention, the computer-implemented method may also include any of the additional aspects described herein for the system for determining estimated tax payments for a taxpayer for a current tax year.

Another embodiment of the present invention is directed to an article of manufacture comprising a non-transitory computer readable medium embodying instructions executable by a computer to execute a process according to any of the method embodiments of the present invention for analyzing a change in the results of a tax calculation caused by a change in taxpayer tax data. For instance, the non-transitory computer readable medium embodying instructions executable by a computer may be configured to execute a process comprising: a tax preparation system, same or similar to that described above, executing the tax estimate engine to access a plurality of calculated past year tax calculation graphs which are the result of calculating each of the past year tax calculation graphs based on respective past year tax data for the taxpayer for each of the past years. The tax estimate engine analyzes and compares each of the past year tax calculation graphs to determine one or more similar node(s) having values which are within a similar range among the past year tax calculation graphs. The tax estimate engine determines a similar node estimating value for one or more of the similar nodes based on the values of the similar nodes on the past year tax calculation graphs. The tax estimate engine provides the similar node estimating values to the tax calculation engine. Next, the tax calculation engine calculates the current year tax calculation graph using the similar node estimating values resulting in a calculated current year tax calculation graph including an estimated tax liability for the current year. Finally, the tax estimate engine computes estimated tax payments for the taxpayer based on the estimated tax liability.

In additional aspects, the article of manufacture may be further configured according to the additional aspects described herein for the system and/or method for determining estimated tax payments for a taxpayer for a current tax year.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

FIG. 4 illustrates a decision table based on or derived from the completeness graph of FIG. 3.

FIG. 5 illustrates another embodiment of a decision table that incorporates statistical data.

DETAILED DESCRIPTION OF ILLUSTRATED EMBODIMENTS

Figure 1:
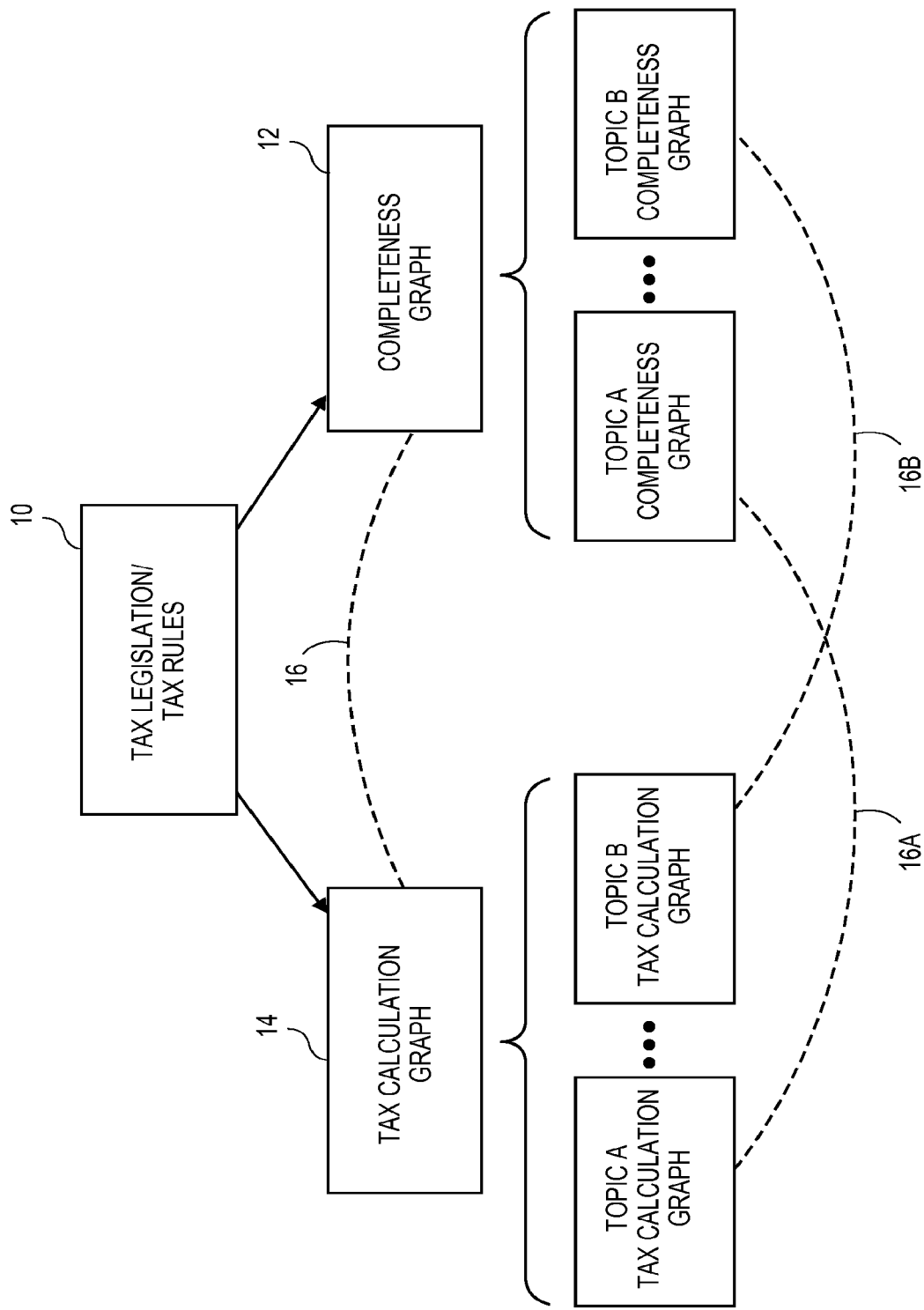
FIG. 1 schematically illustrates how tax legislation/tax rules are parsed and represented by a completeness graph and a tax calculation graph.

Embodiments of the present invention are directed to systems, methods and articles of manufacture for analyzing past year tax data for a taxpayer to determine an estimated current year tax liability in order to compute estimated tax payments for the taxpayer for the current year. The tax preparation system of the present invention comprises a tax estimate engine configured to access a plurality of calculated past year tax calculation graphs. The tax estimate engine analyzes and compares the calculated past year tax calculation graphs to determine similar node(s) and/or dissimilar node(s). The tax estimate engine also determines a similar node estimating value for each of the similar nodes and/or a dissimilar node estimating value for each of the dissimilar nodes. The tax estimate engine provides the similar node(s) and/or dissimilar nodes to a tax calculation engine which calculates a current year tax calculation graph using the similar node estimating values and/or dissimilar node estimating values. The calculated current year tax calculation graph includes an estimated tax liability for the current year, which the system uses to compute estimated tax payments for the taxpayer for the current tax year. The system may then provide the estimated tax payments to the taxpayer.

Tax preparation is a time-consuming and laborious process. It is estimated that individuals and businesses spend around 6.1 billion hours per year complying with the filing requirements of the United States federal Internal Revenue Code. Tax return preparation software has been commercially available to assist taxpayers in preparing their tax returns. Tax return preparation software is typically run on a computing device such as a computer, laptop, tablet, or mobile computing device such as a Smartphone. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software, the present design provides tax preparation software 100 that runs on computing devices 102, 103 (see FIG. 8) and operates on a new construct in which tax rules and the calculations based thereon are established in declarative data-structures, namely, completeness graph(s) and tax calculation graph(s). Completeness graphs 12 (see e.g. FIGS. 1-3) and tax calculation graphs 14 (see e.g. FIGS. 6A-6B) are data structures in the form of trees having nodes and interconnections between the nodes indicating interdependencies. Completeness graphs 12 identify each of the conditions (e.g. questions, criteria, conditions) which may be required to be satisfied to complete a particular tax topic or a complete tax return, and also identifies when all conditions have been satisfied to complete a particular tax topic or, a complete, file-able tax return. The tax calculation graphs 14 semantically describe data dependent nodes, including input nodes, functional nodes, functions, and tax operations, that perform tax calculations or operations in accordance with tax code or tax rules. Examples of these data structures are described in U.S. patent application Ser. Nos. 14/097,057 and 14/448,886, both of which are incorporated by reference as if set forth fully herein.

Use of these data-structures permits the user interface to be loosely connected or even detached from the tax calculation engine and the data used in the tax calculations. Tax calculations are dynamically calculated based on tax data derived from sourced data, estimates, user input, or even intermediate tax calculations that are then utilized for additional tax calculations. A smart tax logic agent running on a set of rules can review current run time data and evaluate missing data fields and propose suggested questions to be asked to a user to fill in missing blanks. This process can be continued until completeness of all tax topics has occurred. An electronic return can then be prepared and filed with respect to the relevant taxing jurisdictions.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI), itemized deductions, tax credits, and the like.

Figure 2:
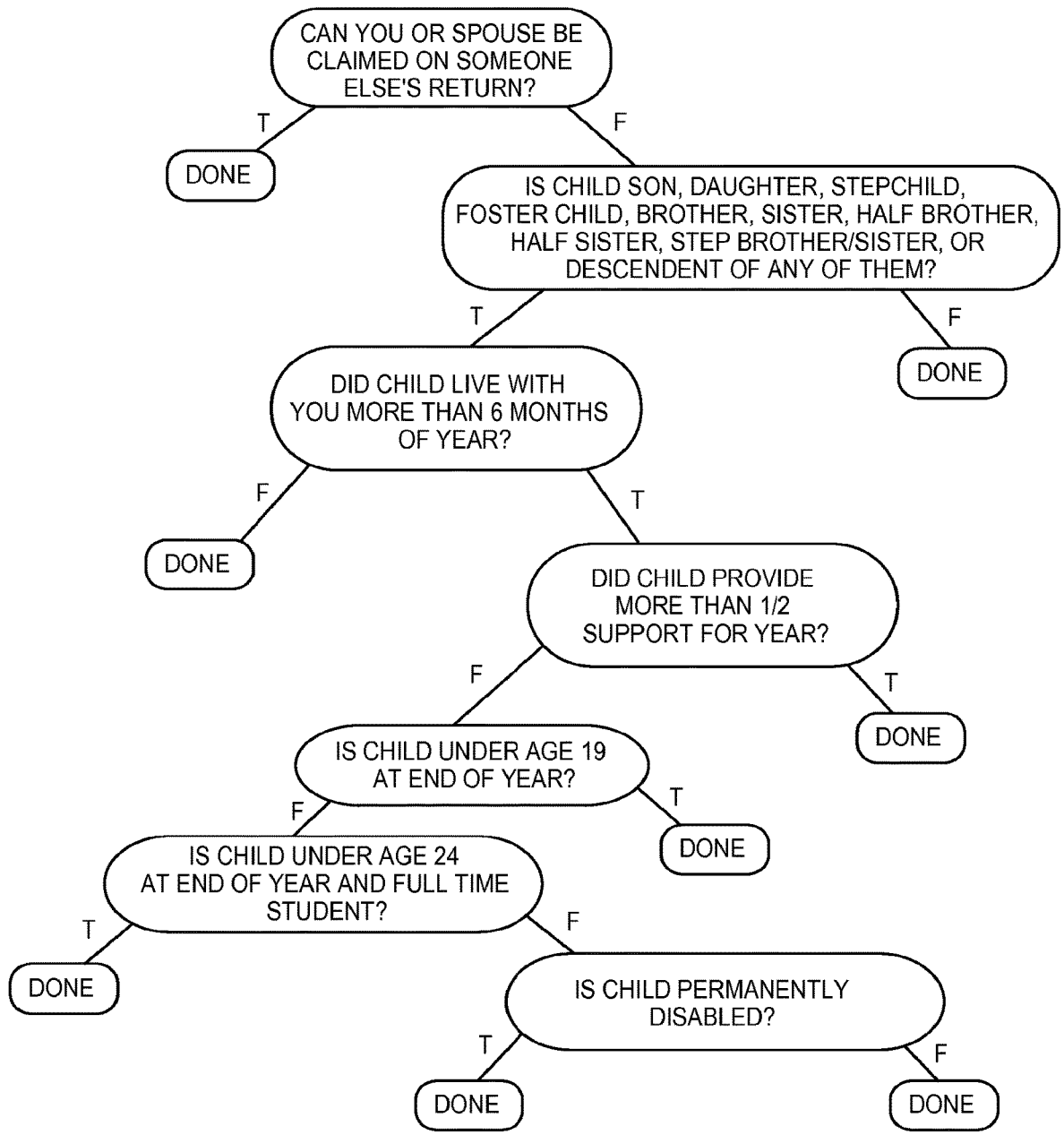
FIG. 2 illustrates an example of a simplified version of a completeness graph related to a qualifying child for purposes of determining deductions for federal income tax purposes.

The completeness graph 12 and the tax calculation graph 14 represent data structures that can be constructed in the form of a tree. FIG. 2 illustrates a completeness graph 12 in the form of a tree with nodes 20 and arcs 22 representing a basic or general version of a completeness graph 12 for the topic of determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated and that can be presented to a user as explained herein.

Figure 3:
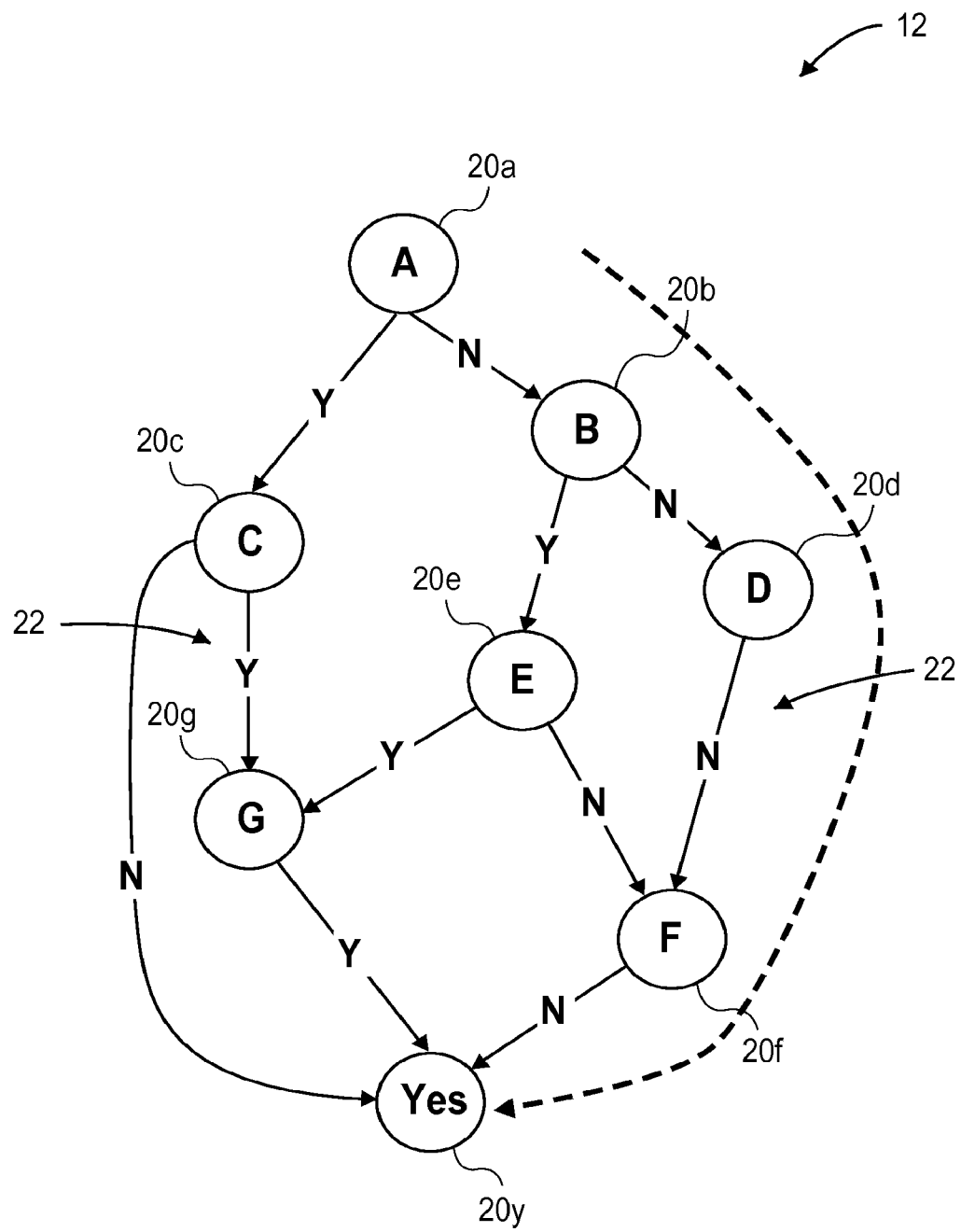
FIG. 3 illustrates another illustration of a completeness graph.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner, the system can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that are irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_c$ and $Q_G$ in columns 34c, 34g, respectively. One of these questions is selected and the process repeats until either the goal 34h is reached or there is an empty candidate list.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified into one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Figure 6A:
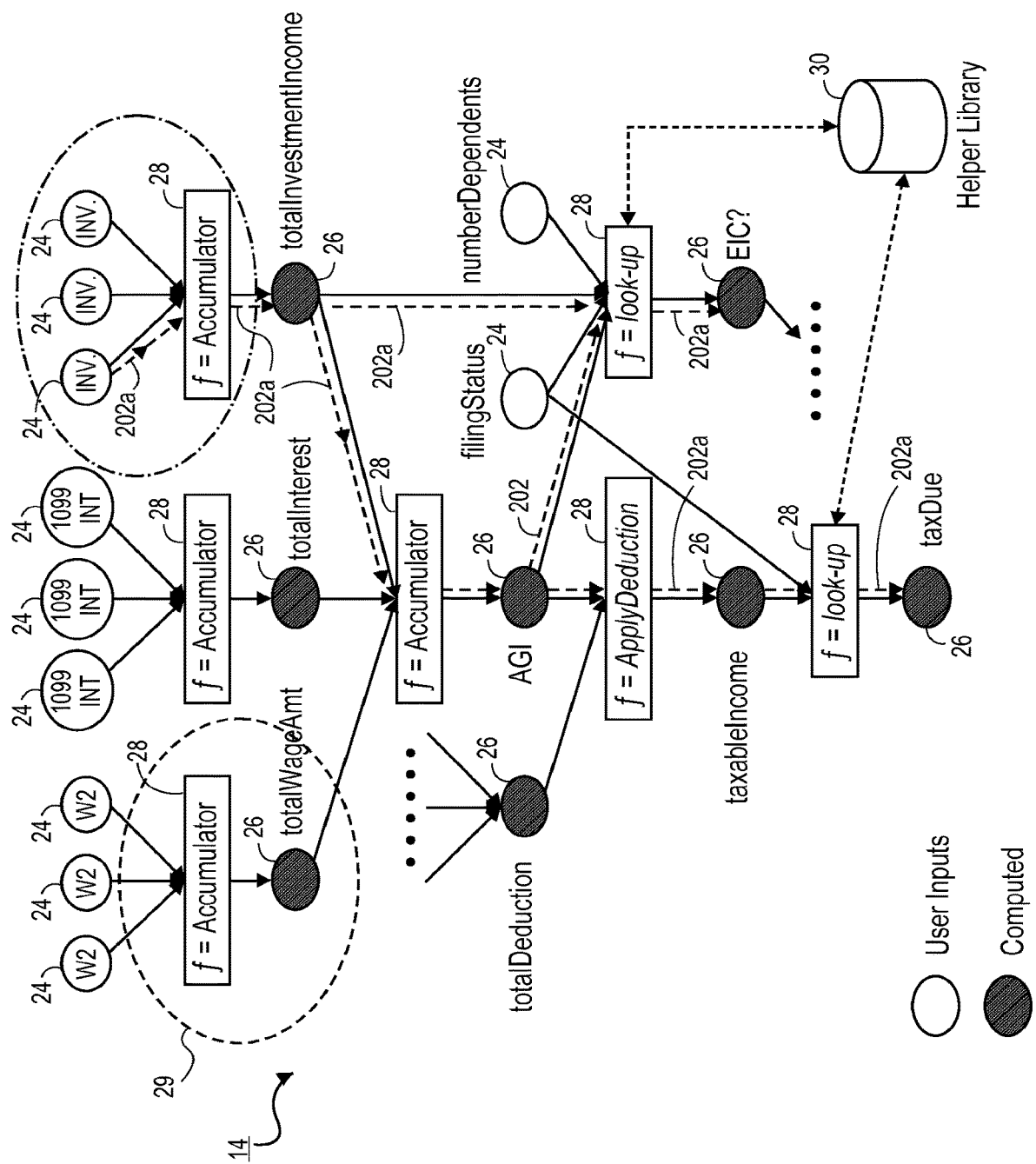
FIG. 6A illustrates an example of a calculation graph and impact chain according to one embodiment.
Figure 6B:
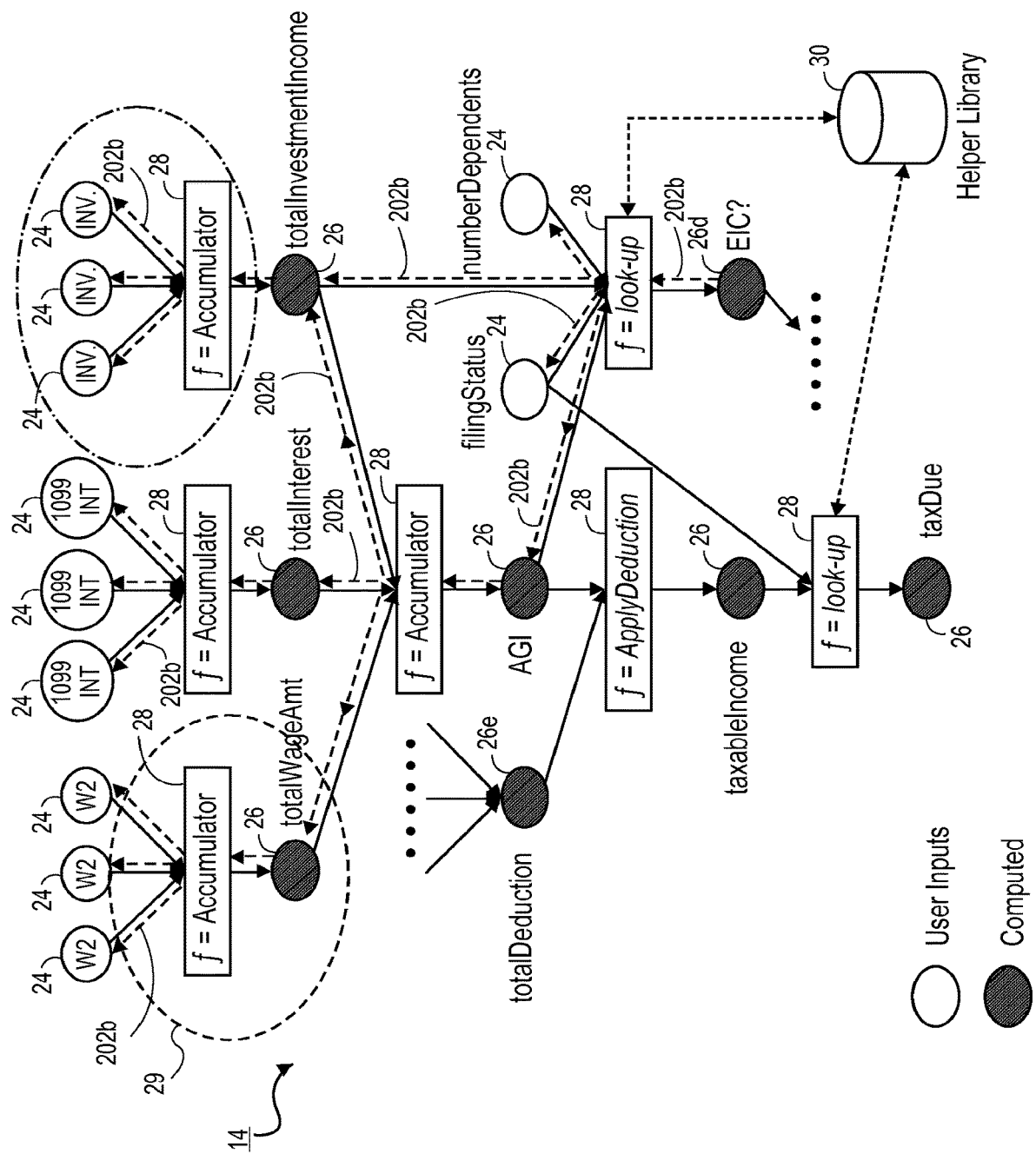
FIG. 6B illustrates an example of a calculation graph and impact chain according to one embodiment.

FIGS. 6A and 6B illustrate an example of a tax calculation graph 14. The tax calculation graph 14 semantically describes data dependent tax operations that are used to perform a tax calculation in accordance with the tax code or tax rules 10. The tax calculation graph 14 in FIGS. 6A and 6B is a simplified view of data dependent tax operations that are used to determine the taxes Due (taxDue) based on various sources of income, deductions, exemptions, and credits. The tax calculation graph 14 is a type of directed graph (which may be composed of a plurality of directed graphs) and, in most situations relevant to tax calculations, is a directed acyclic graph that encodes the data dependencies amongst tax concepts or topics.

In FIG. 6A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user (e.g. a taxpayer) will enter this information from a user interface as described herein. In other embodiments, however, the leaf nodes 24 may be populated with information that is automatically obtained by the tax preparation software 100. For example, in some embodiments, tax documents may be imaged or scanned with relevant data being automatically extracted using Object Character Recognition (OCR) techniques. In other embodiments, prior tax returns may be used by the tax preparation software 100 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax preparation software 100 to obtain information that can then be populated in to respective leaf nodes 24.

In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax preparation software 100. In still other embodiments, values for leaf nodes 24 may be estimated as described herein.

Still other internal nodes, referred to as functional nodes 26, semantically represent a tax concept and may be calculated or otherwise determined using a function node 28 (also referred to as a "function 28"). The functional node 26 and the associated function 28 define a particular tax operation 29. For example, as seen in FIG. 6A, tax operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific tax operation 29 as part of the tax topic.

Interconnected functional node 26 containing data dependent tax concepts or topics are associated with a discrete set of functions 28 that are used to capture domain specific patterns and semantic abstractions used in the tax calculation. The discrete set of functions 28 that are associated with any particular functional node may be commonly re-occurring operations for functions that are used throughout the process of calculating tax liability. For instance, examples of such commonly reoccurring functions 28 include copy, capping, thresholding, accumulation or adding, look-up operations, phase out calculations, comparison calculations, exemptions, exclusions, and the like.

In one embodiment, the entire set of functions 28 that is used to compute or calculate a tax liability is stored within a data store 30 which in some instances may be a database. The various functions 28 that are used to semantically describe data connections between functional nodes 26 can be called upon by the tax preparation software 100 for performing tax calculations. Utilizing these common functions 28 greatly improves the efficiency of the tax preparation software 100 and can be used by a programmer to more easily track and follow the complex nature of the ever-evolving tax code. The common functions 28 also enable easier updating of the tax preparation software 100 because as tax laws and regulations change, fewer changes need to be made to the software code as compared to prior hardwired approaches.

Importantly, the tax calculation graph 14 and the associated functional nodes 26 and function nodes 28 can be tagged and later be used or called upon to intelligently explain to the user the reasoning behind why a particular tax result changed or did not change between a first set of tax data and a second set of tax data having one or more different values, as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

In some embodiments, the function node 28 may include any number of mathematical or other operations. Examples of functions 28 include summation, subtraction, multiplication, division, and look-ups of tables or values from a database 30 or library as is illustrated in FIG. 6A. It should be understood that the functional node 26 within completion graph 12 and the tax calculation graph 14 may be shared in some instances. For example, AGI is a re-occurring tax concept that occurs in many places in the tax code. AGI is used not only for the mathematical computation of taxes but is also used, for example, to determine eligibility of certain tax deductions and credits. Thus, the AGI node is common to both the completion graph 12 and the tax calculation graph 14.

FIG. 6B is the same tax calculation graph as FIG. 6A, except it shows a different impact chain 202, as described in detail below.

Figure 7:
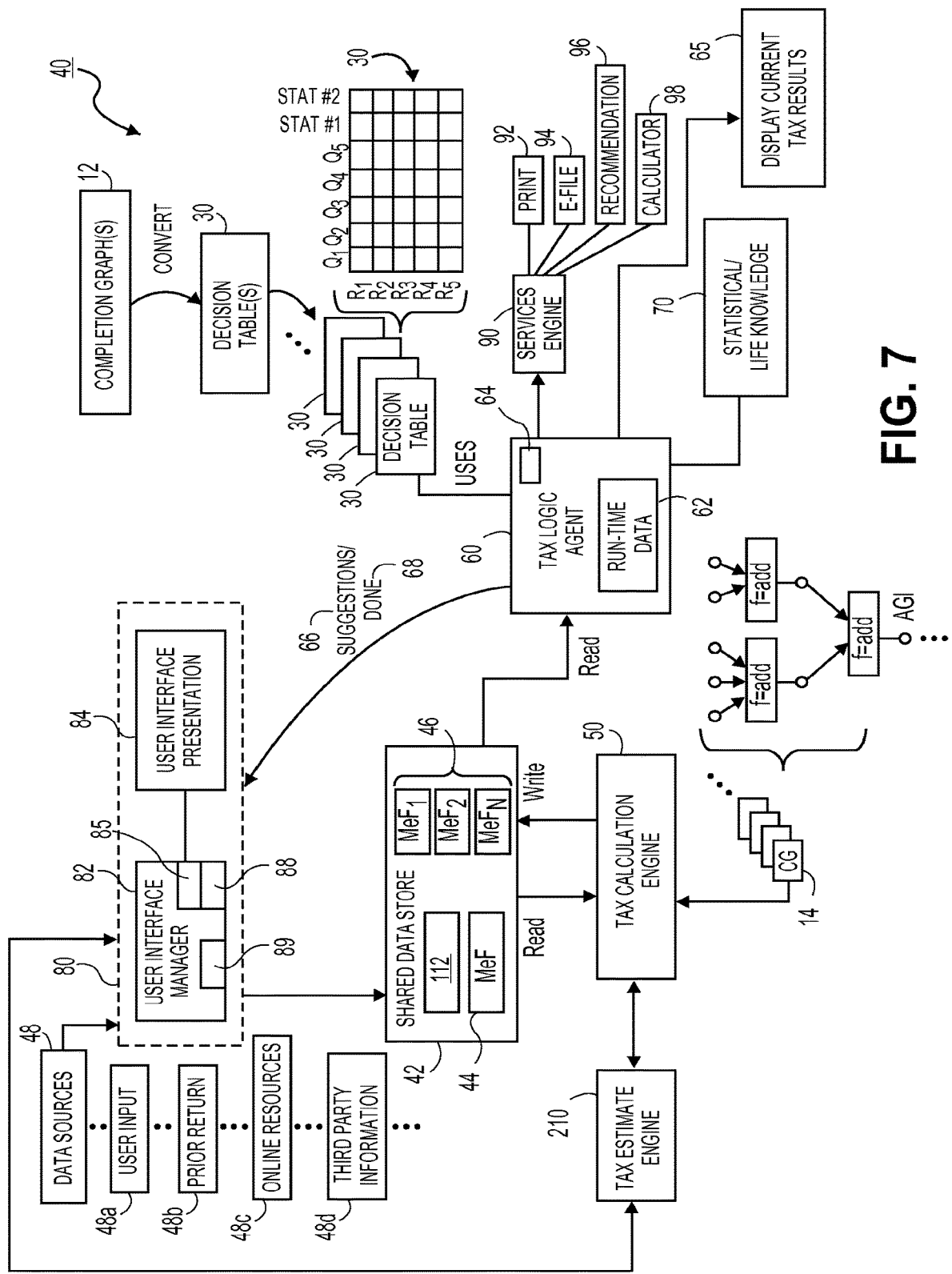
FIG. 7 schematically illustrates a tax preparation system for calculating taxes using rules and calculations based on declarative data structures, and for performing an estimated tax payments function, according to one embodiment.

FIG. 7 schematically illustrates a tax return preparation system 40 for calculating taxes using rules and calculations based on declarative data structures according to one embodiment. The system 40 includes a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein (e.g., FIG. 8). The shared data store 42 may be located on the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version (designated MeF++) of the MeF model established by government authorities that utilizes additional fields. While the particular MeF schema 44 is discussed herein the invention is not so limited. MeF and MeF+++ are only examples of tax agency standards for electronic filing of tax returns, and the present invention is not limited to any particular standard. Accordingly, any references to MeF or MeF++ in the specification or drawings includes any suitable standard for electronic filing of tax returns.

There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 7 illustrates several instances 46 of the MeF schema 44 (labeled as MeF$_1$, MeF$_2$, MeF$_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. This may occur through a user interface control 80 as described herein or, alternatively, data importation may occur directly to the shared data store 42 (not illustrated in FIG. 7). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new ACA many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

For example, user input 48*a* is one type of data source 48. User input 48*a* may take a number of different forms. For example, user input 48*a* may be generated by a user using, for example, an input device such as keyboard, mouse, touchscreen display, voice input (e.g., voice to text feature). photograph or image, or the like to enter information manually into the tax preparation software 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48*b* to be searched but not online resources 48*c*. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48*a* may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48*b*. A prior year tax return 48*b* that is stored electronically can be searched and data is copied and transferred to the shared data store 42. The prior year tax return 48*b* may be in a proprietary format (e.g., .txf, .pdf) or an open source format. The prior year tax return 48*b* may also be in a paper or hardcopy format that can be scanned or imaged whereby data is extracted and transferred to the shared data store 42. In another embodiment, a prior year tax return 48*b* may be obtained by accessing a government database (e.g., IRS records).

An additional example of a data source 48 is an online resource 48*c*. An online resource 48*c* may include, for example, websites for the taxpayer(s) that contain tax-related information. For example, financial service providers such as banks, credit unions, brokerages, investment advisors typically provide online access for their customers to view holdings, balances, and transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48*c* beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?". Additional follow-up questions can then be presented to the user.

Still referring to FIG. 7, another data source 48 includes sources of third party information 48*d* that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48*d* include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48d may also include one of the state-based health insurance exchanges or the federal health insurance exchange (e.g., www.healthcare.gov).

Figure 8:
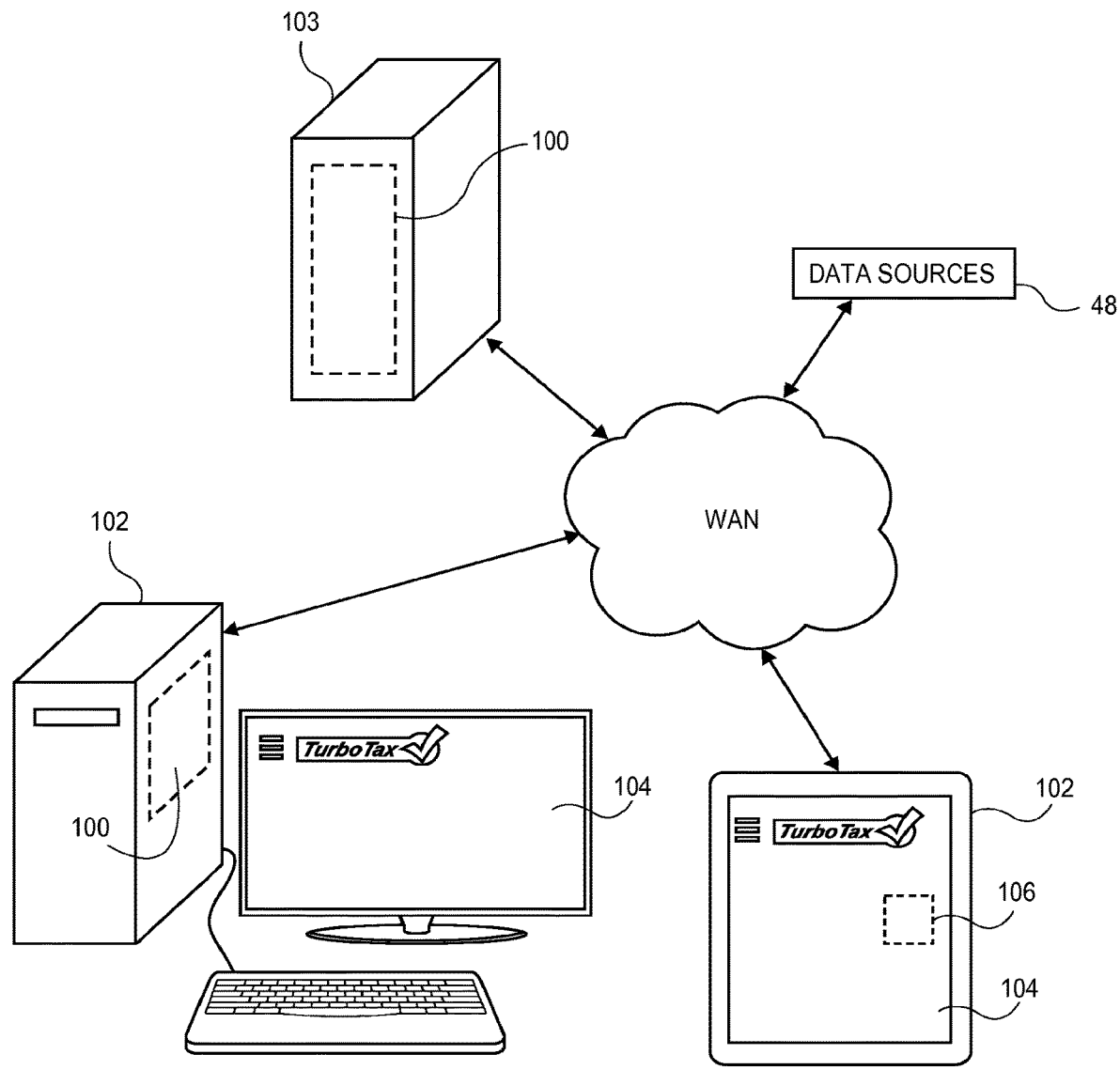
FIG. 8 illustrates the implementation of tax preparation software on various computing devices.

Referring briefly to FIG. 8, the tax preparation software 100 including the system 40 of FIG. 7 is executed by the computing device 102, 103. Referring back to FIG. 7, the tax return preparation software 100 executed by the computing device 102, 103 includes a tax calculation engine 50 that computes one or more tax calculations based on the tax calculation graph(s) 14 and the available data at any given instance within the schema 44 in the shared data store 42. The tax calculation engine 50 may calculate a final tax due amount (i.e. tax liability), a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1, 6A and 6B. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). Tax calculations include, for example, the ACA penalty that is described in FIG. 6B as one illustrative example.

Still referring to FIG. 7, the system 40 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form of a Drools expert engine. Other declarative rules engines 64 may be utilized and a Drools expert rule engine 64 is provided as one example of how embodiments may be implemented. The TLA 60 may be implemented as a dedicated module contained within the tax preparation software 100.

As seen in FIG. 7, the TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, in which case, as explained in more detail below, the UI control 80 presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing or compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules:

Rule engine (64)/Tax Logic Agent (TLA) (60)
    // initialization process
    Load_Tax_Knowledge_Base;
    Create_Fact_Cache; While (new_data_from_application)
    Insert_data_into_fact_cache;
       collection=Execute_Tax_Rules; // collection is all the
          fired rules and corresponding conditions
       suggestions=Generate_suggestions (collection);
    send_to_application(suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant. In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(*b*) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Still referring to FIG. 7, the UI controller 80 encompasses a user interface manager 82 and a user interface presentation or user interface 84. The user interface presentation 84 is controlled by the interface manager 82 and may manifest itself, typically, on a visual screen or display 104 that is presented on a computing device 102 (seen, for example, in FIG. 8). The computing device 102 may include the display of a computer, laptop, tablet, mobile phone (e.g., Smartphone), or the like. Different user interface presentations 84 may be invoked using a UI generator 85 depending, for example, on the type of display or screen 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may comprise pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested from the taxpayer. For example, with regard to donated goods, the taxpayer may be prompted to explain what the donated goods are and describe the same in sufficient detail to satisfy requirements set by a particular taxing authority.

Still referring to FIG. 7, in one aspect, the TLA 60 outputs a current tax result 65 which can be reflected on a display 104 of a computing device 102, 103. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the computing device 102, 103. This information may be displayed contemporaneously with other information, such as user input information, or user interview questions or prompts or even narrative explanations.

The TLA 60 also outputs a tax data that is used to generate the actual tax return (either electronic return or paper return). The return itself can be prepared by the TLA 60 or at the direction of the TLA 60 using, for example, the services engine 90 that is configured to perform a number of tasks or services for the taxpayer. The services engine 90 is operatively coupled to the TLA 60 and is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, it is possible to determine interdependencies of the nodes (including tax operations, functional nodes and function nodes) and the year-over-year calculation graphs 14 can be used to readily identify differences and report the same to a user. Differences can be found using commonly used graph isomorphism algorithms over the two respective calculation graphs 14.

As shown in FIG. 7, the tax preparation system 40 also includes a tax estimate engine 210 for determining estimated tax payments based on past year tax data. The tax estimate engine 210 may operate within the tax preparation software 100, or it may be a separate software application operating independent of the tax preparation software 100, or it may be a separate software program operatively coupled with the tax preparation software 100. As described above, the tax estimate engine 210 is configured to execute an estimated tax payment function which can analyze past year tax results to determine tax values which do not vary much year over year, and tax values which change more significantly year over year. The tax estimate engine can then determine tax values to be used to calculate a current tax year calculation graph to provide a relatively accurate estimate of tax liability for the current year and to compute estimated tax payments.

The tax preparation system 40 may be configured in various ways to allow a user to utilize the estimated tax payment functionality. As some examples, for a web-based tax preparation system 40 in which a user accesses and uses the system 40 through the internet using a web browser, the user may utilize the estimated tax payment function by logging in to the system and then selecting the estimated tax payment function. In another way, the tax preparation system 40 may be configured to send an email or other electronic communication to the user asking if the user wants to obtain estimated tax payment for a taxpayer (e.g. the user) for the current tax year. The estimated tax payment function may also be accessed using text messages, such as SMS or MMS, similar to email. The tax estimate function may also be configured as a mobile device application, in which the user executes the application on a mobile device such as a smartphone, and the application interfaces with the tax preparation system 40 to utilize the tax estimate function. Accordingly, the tax preparation system 40 is configured with interfaces for any of the various modes of utilizing the tax estimate function.

In order to enable the tax estimate functionality, the tax preparation system 40 is configured to comprise a plurality of calculated past tax year calculation graphs (which are the same or similar to the tax calculation graphs 14 described herein) for the taxpayer for at least two previous tax years, referred to herein as "calculated past year tax calculation graphs." The system 40 may obtain the calculated tax year calculation graphs by any suitable means. For instance, the system 40 may simply have the plurality of calculated tax calculation graphs stored from preparing tax returns for the taxpayer for the past years, or stored in a database accessible by the system 40, such as a database of the tax estimate engine 210. Thus, the calculated past year tax calculation graphs are the result of the tax calculation engine calculating each of the past year tax calculation graphs based on respective past year tax data for the taxpayer for each of the past years.

Alternatively, the system 40 may have access to a plurality of past year tax calculation graphs as well as the respective past year tax data for each of the past years. Then, the system 40 can execute the tax calculation engine 50 to calculate each of the past year tax calculation graphs using the respective past year tax data to generate a plurality of calculated past year tax calculation graphs.

The tax preparation system 40 then executes the tax estimate engine 210. As described above, the system 40 may be configured to initiate the tax estimate function in various ways. The tax estimate engine 210 is configured to access the plurality of past year tax calculation graphs stored in the system 40 (e.g. they may be stored in the shared data store 42 or other suitable storage device accessible by the tax estimate engine 210). The tax estimate engine 210 is further configured to analyze and compare the plurality of calculated past year tax calculation graphs to determine one or more similar node(s). The tax estimate engine 210 may analyze and compare all of the nodes on the calculated past year tax calculation graphs, or it may analyze and compare only a certain subset of nodes which are pre-determined, or which are determined to have the most significant impact on tax liability, in general, or specifically to the particular taxpayer. For instance, a taxpayer's income, deductions, and tax credits may have the most significant impact on tax liability, while other nodes, like child tax credit, earned income credit, and the like may have much less or even no impact on the tax liability.

A similar node is a node on the calculated past year tax calculation graphs which has a value on each of the graphs which is within a similar range. The similar range may be any suitable range to determine that the values for a node are not significantly changed between each of the calculated past year tax calculation graphs. For instance, the similar range may be a pre-determined magnitude, such as within a dollar amount or range of magnitude, or within a pre-determined percentage such as within 5%, 10%, 15%, 20%, 25%, 30%, etc., or other measure of similarity. In addition, the similar range may be different for each node of interest on the calculation graphs, or some may be the same.

The tax estimate engine 210 is also configured to determine a value for each of the similar nodes to be used in estimating the current year tax liability, referred to as a "similar node estimating value." In other words, the tax estimate engine 210 uses the calculated past year tax calculation graphs to determine reasonable estimated values for tax data to be used to estimate the current year taxes. The tax data may include values for input nodes 24, functional nodes 26, stored function nodes 28 and/or tax operation nodes 29. Thus, the tax estimate engine 210 determines a similar node estimating value for a similar node based on the values of the similar nodes on the calculated past year tax calculation graphs. For instance, the similar node estimating value for a similar node may be an average of the values of the respective node from each of the calculated past year tax calculation graphs, or the value from one of the graphs that will result in the highest or lowest tax liability. Choosing the value that will result in the highest tax liability will provide a pessimistic or conservative estimated tax liability for the current year, while choosing the value that will result in the lowest tax liability will result in an optimistic estimated tax liability for the current year. The tax estimate engine 210 may use any other suitable method of determining a similar node estimating value for each of the similar nodes.

The tax estimate engine 210 may also be configured to determine one or more dissimilar nodes on the calculated past year tax calculation graphs. For example, a node having a significant impact on tax liability may not be a similar node, as determined above. Thus, the tax estimate engine 210 can determine such node as a dissimilar node and then determine a dissimilar node estimating value for estimating the current year tax liability, as described below. The tax estimate engine 210 may analyze and compare all of the nodes on the past year tax calculation graphs, or it may analyze and compare only a certain subset of nodes which are pre-determined, or which are determined to have the most significant impact on tax liability, in general, or specifically to the particular taxpayer. For instance, a taxpayer's income, deductions, and tax credits may have the most significant impact on tax liability, while other nodes, like child tax credit, earned income credit, and the like may have much less or even no impact on the tax liability.

A dissimilar node is a node on the calculated past year tax calculation graphs which has a value on each of the graphs which is outside a dissimilar range. The dissimilar range may any suitable range to determine that the values for a node are significantly changed between each of the calculated past year tax calculation graphs. For instance, the dissimilar range may be a pre-determined magnitude, such as outside a dollar amount or range of magnitude, or outside a pre-determined percentage such as within 5%, 10%, 15%, 20%, 25%, 30%, etc., or other measure of dissimilarity. In addition, the dissimilar range may be different for each node of interest on the calculation graphs, or some may be the same.

The tax estimate engine 210 is also configured to determine a value for each of the dissimilar nodes to be used in estimating the current year tax liability, referred to as a "dissimilar node estimating value." In other words, the tax estimate engine 210 may use the calculated past year tax calculation graphs to determine reasonable estimated values for tax data to be used to estimate the current year tax liability. Like the similar node estimating value, the tax estimate engine 210 may determine a dissimilar node estimating value for a dissimilar node based on the values of the dissimilar nodes on the calculated past year tax calculation graphs. For instance, the dissimilar node estimating value for a dissimilar node may be an average of the values of the respective node from each of the calculated past year tax calculation graphs, or the value from one of the graphs that will result in the highest or lowest tax liability. Choosing the value that will result in the highest tax liability will provide a pessimistic or conservative estimated tax liability for the current year, while choosing the value that will result in the lowest tax liability will result in an optimistic estimated tax liability for the current year. The tax estimate engine 210 may use any other suitable method of determining a dissimilar node estimating value for each of the dissimilar nodes.

The tax estimate engine 210 may also determine that it is unable to compute an accurate estimate of tax liability for the current year with a high level of confidence using the similar estimating values and/or the dissimilar estimating values For instance, the tax estimate engine 210 may determine that the taxpayer's income varied significantly during the past years, and therefore, it cannot assign a similar node estimating value or dissimilar node estimating value for income. The tax estimate engine is configured to determine estimating tax data needed to provide an accurate estimate of tax liability for the current year. In such case, the system 40 may be configured to determine a modified estimating value for the questionable similar nodes and/or dissimilar node to be used for calculating an estimate of tax liability for the current year by accessing estimating tax data. In one way, the system 40 may show the questionable similar node estimating values and/or dissimilar node estimating values to the user, and request the user to provide a modified estimating value for the similar nodes and/or dissimilar node, or confirm that the values shown are sufficiently accurate to compute an estimated tax liability. The system 40 may also be configured to determine a modified estimating value to increase the confidence level of the estimated tax liability by accessing estimating tax data. The tax preparation system 40 is configured to access the estimating tax data, such as by requesting the estimating tax data from a user, or accessing a remotely located user-specific data source 48 and automatically importing tax data related to the estimating tax data, as described herein.

The similar nodes and dissimilar nodes may also be determined using pre-defined impact chains 202, as shown on FIGS. 6A and 6B. The pre-defined impact chains 202 are determined from the tax calculation graphs. Several examples of impact chains 202 are shown on FIGS. 6A and 6B. An impact chain 202 is a sequence of interdependent nodes within the tax calculation graph having a cause and effect relationship. In other words, an impact chain for a particular node consists of one of (a) each of the other nodes which are affected by the particular node, or (b) each of the other nodes which affect the particular node. A first node "is affected" by another node if the first node is dependent on the other node, such as the value, result or outcome of the first node depends on the value, result or outcome of the other node. Similarly, a first node "affects" another node if the other node is dependent on the first node, such as the value, result or outcome of the other node depends on the value, result or outcome of the first node. The nodes of the tax calculation graph comprise a plurality of input nodes, functional nodes, function nodes, and tax operations (which are defined by a functional node and an associated function). An impact chain engine of the tax preparation system 40 may be configured to analyze the tax calculation graph 14 and determine one or more impact chains 202, wherein each impact chain includes each of the nodes in the tax calculation graph which are interdependent on each other. An example of an impact chain engine is described in U.S. patent application Ser. No. 14/529,798, which is incorporated by reference as if set forth fully herein.

In order to determine the similar nodes and/or dissimilar nodes, the tax estimate engine 210 traverses the impact chain 202 on each of the calculated past year tax calculation graphs and identifies any of the nodes having values which are within the similar range and/or dissimilar range, respectively. For example, the tax estimate engine may start at the EIC node 26d, and then traverse the impact chain 202b to each of the nodes on the impact chain 202b.

The tax preparation system 40 then executes the tax calculation engine 50 to calculate the current year tax calculation graph using the similar node estimating values, the dissimilar estimating values, and/or any modified estimating values. This generates a calculated current year tax calculation graph, which includes the calculation of the estimated tax liability for the current year. The tax preparation system 40 can then compute estimated tax payments for the taxpayer based on the estimated tax payments. The system 40 may also request the user to select the type of estimated tax payments that the taxpayer plans to make, such as withholding tax payments from periodic paychecks (and also providing the period, such as monthly, bi-weekly, etc.) or quarterly estimated tax payments. As some examples, if the user selects estimated tax payments in the form of withholding tax from monthly paychecks, the system 40 can simply compute the estimated tax payments for each paycheck as the total estimated tax liability divided by 12 months. Similar calculations can be performed for other withholding situations, and also for quarterly estimated tax payments.

The tax preparation system 40 and tax estimate engine 210 may also be configured to take into account potential changes in the tax law in determining the estimated tax liability and estimated tax payments. The change in tax law is programmed into the current year tax calculation graph. The tax estimate engine 210 may determine similar node estimating values, as described above, for nodes in the calculation graph directed to the change in tax law, if possible. If the tax estimate engine 210 is unable to determine these similar node estimating values, such as because it requires additional estimating tax data, then the system 40 accesses the estimating tax data by any of the methods described herein (e.g. requesting the estimating tax data from the user or accessing it from a data source 48). The tax estimate engine 210 determines an estimating tax value using the estimating tax data. The system 40 executes the tax calculation engine 50 to calculate the current year tax calculation graph using similar node(s) and/or accessed estimated tax data to calculate the current year tax calculation graph with the changes in tax law incorporated. The calculated current year tax calculation graph includes the estimated tax liability and the tax estimate engine 210 can compute the estimated tax payments based on the estimated tax liability, as described above.

The tax preparation system 40 may provide the estimated tax payments to the user by any suitable method, including any of the communication modes described above with respect to initiating the estimated tax payment function. For instance, the tax preparation system 40 may utilize the user interface manager 82 to generate an appropriate user interface presentation 84 for display to the user. The user interface presentation 84 displayed to the user may include the estimated tax payments, as well as the most significant tax data affecting the estimated tax payments. For example, the presentation 84 may include the estimated tax liability, income, deductions, and other similar node estimating values, dissimilar estimating values and modified estimating values.

The user interface presentation 84 of the estimated tax payments may be presented in a form allowing the user to make modifications to the tax data used to generate the estimates. The form may be a list with the tax data displayed in text boxes which allow the text to be modified, or a spreadsheet in which the user can modify the values of the cells in the spreadsheet. In another embodiment, the spreadsheet or form can be emailed or sent as a text message to a user. The user can then make modifications to the form or spreadsheet and transmit the modified form or spreadsheet to the system 40.

The system 40 may then re-calculate the current year tax calculation graph using the modified tax data input by the user to generate a revised calculated current year tax calculation graph, including a revised estimated tax liability. The system 40 then computes revised estimated tax payments and displays the revised estimated tax payments, and/or the updated other tax data, in the same manner as described above. The system 40 can repeat the process to obtain as many estimates as desired by the user.

The tax preparation system 40 may also be configured to assist the user (e.g. taxpayer) in arranging to make the estimated tax payments. As an example, the system 40 asks the user whether the user wants to schedule the estimated tax payments to be made from a financial account of the taxpayer at a financial institution, or complete and submit a new form for withholding tax (e.g. form W-4 for U.S. federal withholding tax). When the user selects to schedule estimated tax payment(s) from a financial institution, the system 40 requests the financial account information for making the payment(s), and the date(s) for the payment(s). The system 40 then processes the scheduled estimated tax payments, by any suitable means, such as ACH payments, or other electronic payment system.

When the user selects to submit a new withholding form, the system 40 may compute and complete a withholding form for the taxpayer. The system 40 may use the tax data, including the similar node estimating values, dissimilar node estimating values and/or modified estimating values to compute any schedules and/or worksheets for preparing a withholding form. The system 40 fills in the withholding form and provides it to the user for submission by the taxpayer (usually to the employer or payroll service) or the system may obtain information for submitting the form and submit the withholding form on behalf of the taxpayer.

Encapsulating the tax code and regulations within calculation graphs 14 results in much improved testability and maintainability of the tax preparation software 100. Software programming errors ("bugs") can be identified more easily when the calculation graphs 14 are used because such bugs can be traced more easily. In addition, updates to the calculation graphs 14 can be readily performed with less effort when tax code or regulations change.

In operation of the system 40 to prepare a tax return and/or obtain an estimate of estimated tax payments, a user initiates the tax preparation software 100 on a computing device 102, 103 as seen, for example, in FIG. 8. The tax preparation software 100 may reside on the actual computing device 102 that the user interfaces with or, alternatively, the tax preparation software 100 may reside on a remote computing device 103 such as a server or the like as illustrated. In such instances, the computing device 102 that is utilized by the user or tax payer communicates via the remote computing device 103 using an application 106 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

A user initiating the tax preparation software 100, as explained herein, may import tax related information from one or more data sources 48. Tax data may also be input manually with user input 48a. The tax calculation engine 50 computes one or more tax calculation graphs dynamically based on the then available data at any given instance within the schema 44 in the shared data store 42. In some instances, estimates or educated guesses may be made for missing data. Details regarding how such estimates or educated guesses are done maybe found in U.S. patent application Ser. No. 14/448,986 which is incorporated by reference as if set forth fully herein.

The tax preparation system 40 may at any time execute the estimated tax payments function, when initiated as described above. The system 40 executes the tax estimate engine 210 to access a plurality of calculated past year tax calculation graphs and to determine one or more similar nodes and/or dissimilar nodes. The tax estimate engine 210 analyzes and compares the calculated tax calculation graphs to determine one or more similar node estimating values and/or one or more dissimilar node estimating values. When the tax estimating engine 210 determines it needs more tax data to provide an estimated tax payment with reasonable confidence, then the system 40 obtains estimating tax data which the estimated tax engine uses to determine modified estimating values. The system 40 then executes the tax calculation 50 to calculate a current tax year calculation graph using the similar node estimating values, dissimilar node estimating values and/or modified estimating values. The system 40 then determines an estimated tax payment using an estimated tax liability from the calculated current tax year calculation graph. The system 40 then communicates the estimated tax payments, along with pertinent tax data, to the user. The system 40 may also assist the taxpayer in making the estimated tax payments, as described above.

Figure 9:
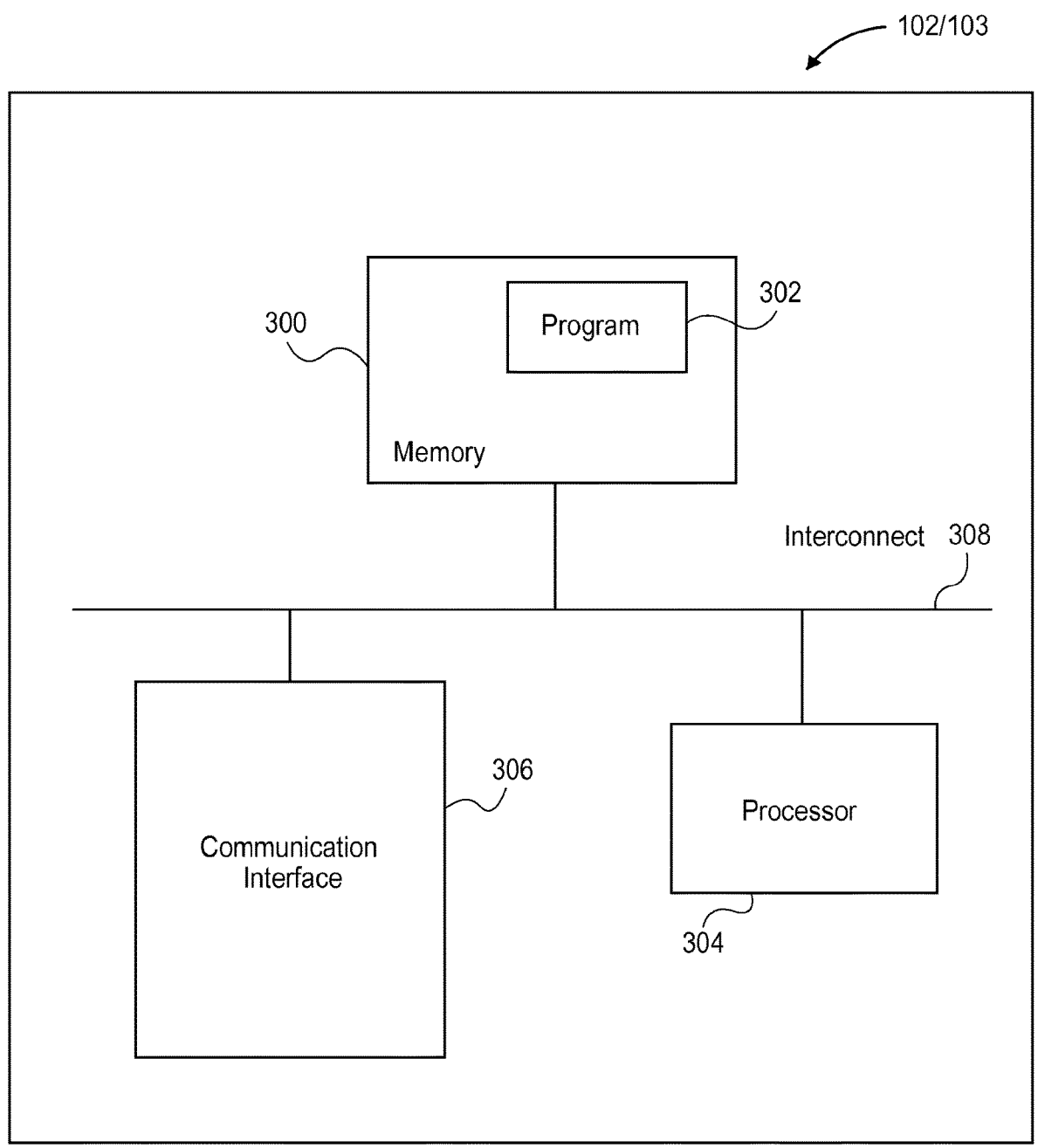
FIG. 9 illustrates generally the components of a computing device that may be utilized to execute the software for automatically calculating or determining tax liability, performing an estimated tax payments function, and/or preparing a tax return based thereon, according to the embodiments of the invention.

FIG. 9 generally illustrates components of a computing device 102, 103 that may be utilized to execute the software for automatically calculating or determining tax liability and preparing an electronic or paper return based thereon. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 9 is provided to generally illustrate how embodiments may be configured and implemented.

The described embodiments of the present invention, including the functions performed by the system 40 and its components, may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computing system, comprising:
 a computing device having a processor and a memory, the computing device being configured to execute a computerized form preparation application;
 a shared data store in communication with the computing device and operable to store user-specific data therein; and
 the computerized form preparation application comprising computer-executable instructions stored in the memory of the computing device, the computerized form preparation application comprising:
 a calculation engine in communication with the shared data store,
 a plurality of calculation graphs of the computerized form preparation application, each calculation graph representing a respective calculation graph data structure and comprising a plurality of nodes, the plurality of nodes including one or more of input nodes, function nodes representing functions associated with values populated into respective input nodes, and functional nodes populated with a respective calculation result generated by execution of the respective functions, each calculation graph comprising a plurality of calculation paths, wherein each calculation path connects a plurality of nodes that are data dependent such that a node is connected to another node if the node depends on a value of the another node, the plurality of calculation graphs comprising:
a current year calculation graph, and
at least one of (i) a plurality of past year calculation graphs for each of a plurality of past years or (ii) a plurality of calculated past year calculation graphs which are the result of the calculation engine calculating each of the past year calculation graphs based on respective past year data for a user for each of the past years,
an estimate engine in communication with the calculation engine, and
a user interface controller in communication with the estimate engine and the shared data store, the instructions being executed by the processor to cause the processor to:
by executing the calculation engine:
read the user-specific data from the shared data store;
perform a plurality of calculation operations using the user-specific data as inputs to respective calculation graphs executed to determine calculated data;
write the calculated data to the shared data store to update the user-specific data stored in the shared data store;
by executing the estimate engine:
access the plurality of calculated past year calculation graphs;
analyze and compare each of the calculated past year calculation graphs to determine one or more corresponding similar nodes having values which are within a similar range of 10% or less among the calculated past year calculation graphs;
determine a similar node estimating value for each similar node based on the values of the respective similar nodes on each of the calculated past year calculation graphs; and
provide the similar node estimating values to the calculation engine executed by the processor to calculate the current year calculation graph using the similar node estimating values resulting in a calculated current year calculation graph including an estimated total for the current year.

2. The computing system of claim 1, wherein the instructions of the computerized form preparation application are further executed by the processor to, by executing the calculation engine, calculate each of the past year calculation graphs based on respective past year data for the user for each of the past years.

3. The computing system of claim 1, wherein the instructions are further executed by the processor to, by executing the estimate engine:
analyze and compare each of the calculated past year calculation graphs to determine one or more dissimilar nodes having values which are outside a dissimilar range of 10% or more among the calculated past year calculation graphs;
determine a dissimilar node estimating value for each dissimilar node, wherein the dissimilar node estimating value is determined to result in a same or higher total than each of the values of the respective dissimilar nodes on any of the calculated past year calculation graphs; and
provide the dissimilar node estimating values to the calculation engine to calculate the current year calculation graph using both the similar node estimating values and the dissimilar node estimating values resulting in a calculated current year calculation graph including the estimated total for the current year.

4. The computing system of claim 3, wherein the instructions are further executed by the processor to, by executing the estimate engine:
analyze the current year calculation graph in relation to the past year calculation graphs to determine one or more new nodes on the current year calculation graph which are not on any of the past year calculation graphs;
determine a new node estimating value for each of the one or more of the new nodes; and
provide the new node estimating values to the calculation engine to calculate the current year calculation graph using the similar node estimating values, the dissimilar node estimating values and the new node estimating values, resulting in a calculated current year calculation graph including an estimated total for the current year.

5. The computing system of claim 1, wherein the instructions are further executed by the processor to, by executing the estimate engine:
analyze and compare each of the calculated past year calculation graphs to determine one or more dissimilar nodes having values which are outside a dissimilar range of 10% or more among the calculated past year calculation graphs;
determine a dissimilar node estimating value for the one or more of the dissimilar nodes wherein the dissimilar node estimating value is determined to result in a same or lower total than each of the values on any of the calculated past year calculation graphs; and
provide the dissimilar node estimating values to the calculation engine to calculate the current year calculation graph using both the similar node estimating values and the dissimilar node estimating values resulting in a calculated current year calculation graph including an estimated total for the current year.

6. The computing system of claim 5, wherein the instructions are further executed by the processor to, by executing the estimate engine: analyze the current year calculation graph in relation to the past year calculation graphs to determine one or more new nodes on the current year calculation graph which are not on any of the past year calculation graphs; determine a new node estimating value for one or more of the new nodes; and provide the new node estimating value to the calculation engine to calculate the current year calculation graph using the similar node estimating values, the dissimilar node estimating values and the new node estimating values, resulting in a calculated current year calculation graph including an estimated total for the current year.

7. The computing system of claim 1, wherein the instructions are further executed by the processor to:
by executing the user interface controller, communicate the similar node estimating values to the user through a user computing device over a network and requesting confirmation or changes to the similar node estimating values; receive a confirmation and/or changed similar node estimating values from the user; provide any changes to the similar node estimating values to the estimate engine; and communicate estimated payments to the user; and
by executing the estimate engine, provide the changes to the similar node estimating values to the calculation engine executed by the processor to recalculate the current year calculation graph using the changed similar node estimating values to generate a revised current year calculation graph thereby generating a revised estimated total for the current year.

8. The computing system of claim 7, wherein the instructions are further executed by the processor to, by executing the user interface controller, communicate the similar node estimating values to the user through the user computing device using one of a website via a website browser, an email, a text message, or a website via a mobile browser interface.

9. The computing system of claim 7, wherein the instructions of the computerized form preparation application are further executed by the processor to determine a display set of similar node estimating values having a majority of an impact on the total to communicate to the user, and the user interface controller communicates only the display set of similar node estimating values to the user.

10. The computing system of claim 1, wherein the instructions are further executed by the processor to, by executing the estimate engine:
    determine that an accurate estimate of total for the current year cannot be calculated based on data for the user currently available to the system; determine estimating data needed to provide an accurate estimate of total for the current year,
    wherein the computerized form preparation application is executed by the processor to access the estimating data.

11. The computing system of claim 1, wherein the instructions of the computerized form preparation are further executed by the processor to access the estimating data by one of (i) executing the user interface controller to request the estimating data from a user, (ii) accessing one or more remotely located user-specific data sources and automatically importing data related to the estimating data from the user-specific data sources.

12. The computing system of claim 1, wherein the computerized form preparation application further comprises:
    a rule-based logic agent in communication with the user interface controller and the shared data store and being executed by the processor to read the user-specific data from the shared data store; and
    a data structure comprising a table including a plurality of rows and a plurality of columns, wherein respective cells are defined by respective intersections of respective rows and columns, and wherein respective rules are defined by respective rows of the table and respective questions are defined by respective columns of the table;
    the rule-based logic agent being executed by the processor to apply the user-specific data as inputs to respective cells of the table, eliminate rows of the table based on the user-specific data and eliminate respective rules, and identify candidate questions defined by columns of the table that remain after row elimination, generate a non-binding suggestion based at least in part upon the candidate questions and communicate the non-binding suggestion to the user interface controller such that the rule-based logic agent is configured to minimize subsequent questions for the non-binding suggestion;
    the user interface controller being executed by the processor to generate a user interface for presentation to the user of the computerized form preparation application through the computer display based at least in part upon the non-binding suggestion, receive user input through the user interface, and update the user-specific data in the shared data store based on the user input.

13. The computing system of claim 12, wherein the user interface controller is further executed to process at least an external configuration file to determine whether and when to process the one or more non-binding suggestions provided by the rule-based logic agent, the at least configuration file specifying a particular priority or sequence of processing the one or more non-binding suggestions, the at least configuration file specifying contents of the user interface presentation to be generated based at least in part upon the one or more non-binding suggestions.

14. A method implemented by a computing device in a computing system, the computing system comprising a shared data store in communication with the computing device and operable to store user-specific data, the computing device having a processor and a memory, the method comprising:
    executing, by the computing device, a computerized form preparation application comprising computer-executable instructions stored in the memory of the computing device, wherein the computerized form preparation application comprises:
        a calculation engine,
        a plurality of calculation graphs, each calculation graph representing a respective calculation graph data structure executed to perform data dependent operations comprising a plurality of nodes including one or more of input nodes, function nodes representing functions associated with values populated into respective input nodes, and functional nodes populated with a respective calculation result generated by execution of the respective functions, each calculation graph comprising a plurality of calculation paths, wherein each calculation path connects a plurality of nodes that are data dependent such that a node is connected to another node if the node depends on the another node,
        a current year calculation graph,
        an estimate engine, and
        a user interface controller in communication with the estimate engine and the shared data store,
    executing the instructions on the processor to cause the processor to perform processing comprising:
        by executing the calculation engine in communication with the shared data store:
            reading the user-specific data from the shared data store,
            performing a plurality of calculation operations using the user-specific data as input to respective calculation graphs executed to determine calculated data, and
            writing the calculated data to the shared data store to update the user-specific data stored in the shared data store,
        obtaining, from the shared data store, at least one of (i) a plurality of past year calculation graphs for each of a plurality of past years and (ii) a plurality of calculated past year calculation graphs that a node is connected to another node if the node depends on execution of the other node;
        by executing the estimate engine of the computerized form preparation application in communication with the calculation engine:
            accessing the plurality of calculated past year calculation graphs;
            analyzing and comparing each of the calculated past year calculation graphs to determine one or more corresponding similar nodes having values which are within a similar range of 10% or less among the calculated past year calculation graphs;

determining a similar node estimating value for each similar node based on the values of the respective similar nodes on each of the calculated past year calculation graphs;

providing the similar node estimating values to the calculation engine executed by the processor; and calculating the current year calculation graph using the similar node estimating values resulting in a calculated current year calculation graph including an estimated total for the current year.

15. The method of claim 14, wherein the processing further comprises:

by executing the calculation engine calculating each of the past year calculation graphs based on respective past year data for the user for each of the past years.

16. The method of claim 14, wherein the processing further comprises:

by executing the estimate engine, analyzing and comparing each of the calculated past year calculation graphs to determine one or more dissimilar nodes having values which are outside a dissimilar range of 10% or more among the calculated past year calculation graphs, determining a dissimilar node estimating value for one or more of the dissimilar nodes wherein the dissimilar node estimating value is determined to result in a same or higher total than each of the values of the respective dissimilar nodes on any of the calculated past year calculation graphs; and by executing the calculation engine, calculating the current year calculation graph using both the similar node estimating values and the dissimilar node estimating values.

17. The method of claim 16, wherein the processing further comprises:

by executing the estimate engine, analyzing the current year calculation graph in relation to the past year calculation graphs to determine one or more new nodes on the current year calculation graph which are not on any of the past year calculation graphs; and determining a new node estimating value for one or more of the new nodes;

wherein the calculation engine is executed by the processor to calculate the current year calculation graph using the similar node estimating values, the dissimilar node estimating values and the new node estimating values.

18. The method of claim 14, wherein the processing further comprises:

by executing the estimate engine, analyzing and comparing each of the calculated past year calculation graphs to determine one or more dissimilar node(s) having values which are outside a dissimilar range of 10% or more among the calculated past year calculation graphs; and determining a dissimilar node estimating value for wherein the dissimilar node estimating value is determined to result in a same or lower total than each of the values on any of the calculated past year calculation graphs;

wherein the calculation engine is executed by the processor to calculate the current year calculation graph using both the similar node estimating values and the dissimilar node estimating values.

19. The method of claim 18, wherein the processing further comprises:

by executing the estimate engine analyzing the current year calculation graph in relation to the past year calculation graphs to determine one or more new nodes on the current year calculation graph which are not on any of the past year calculation graphs; and determining a new node estimating value for one or more of the new nodes;

wherein the calculation engine is executed by the processor to calculate the current year calculation graph using the similar node estimating values, the dissimilar node estimating values and the new node estimating values.

20. The method of claim 14, wherein the processing further comprises:

the user interface controller communicating the similar node estimating values to a user and requesting confirmation or changes to the similar node estimating values;

the user interface controller receiving a confirmation and/or changed similar node estimating values from the user;

the user interface controller providing any changes to the similar node estimating values to the estimate engine, wherein the calculation engine is executed by the processor to calculate the current year calculation graph using the changed similar node estimating values; and the user interface controller communicating estimated payments to a user.

21. The method of claim 20, wherein the processing further comprises, by executing the user interface controller communicating the similar node estimating values to the user using one of a website via a website browser, an email, a text message, or a website via a mobile browser interface.

22. The method of claim 20, wherein the computerized form preparation application is executed by the processor to determine a display set of similar node estimating values having a majority of an impact on the total to communicate to the user, and the user interface controller is executed by the processor to communicate only the display set of similar node estimating values to the user.

23. The method of claim 14, wherein the processing further comprises:

determining that an accurate estimate of total for the current year cannot be calculated based on data for the user currently available to the computing system;

the computing system determining estimating data needed to provide an accurate estimate of total for the current year; and the computerized form preparation application accessing the estimating data.

24. The method of claim 14, wherein the computerized form preparation application is executed by the processor to access the estimating data by one of (i) executing the user interface controller to request the estimating data from a user, (ii) accessing one or more remotely located user-specific data sources and automatically importing data related to the estimating data from the user-specific data sources.

25. The method of claim 14, wherein the computerized form preparation application further comprises:

a rule-based logic agent in communication with the user interface controller and the shared data store and executed by the processor to read the user-specific data from the shared data store;

a data structure comprising a table including a plurality of rows and a plurality of columns, wherein respective cells are defined by respective intersections of respective rows and columns, and wherein respective rules are defined by respective rows of the table and respective questions are defined by respective columns of the table;

the rule-based being executed by the processor to apply the user-specific data as inputs to respective cells of the table, eliminate rows of the table based on the user-specific data and eliminate respective rules, and identify candidate questions defined by columns of the table that remain after row elimination, generate a non-binding suggestion based at least in part upon the candidate questions and communicate the non-binding suggestion to the user interface controller such that the rule-based logic agent is configured to minimize subsequent questions for the non-binding suggestion; and the user interface controller being executed by the processor to generate a user interface for presentation to the user of the computerized form preparation application through the computer display based at least in part upon the non-binding suggestion, receive user input through the user interface, and update the user-specific data in the shared data store based on the user input.

26. The method of claim 25, wherein the user interface controller is further executed by the processor to process at least an external configuration file to determine whether and when to process the one or more non-binding suggestions provided by the rule-based logic agent, the at least configuration file specifying a particular priority or sequence of processing the one or more non-binding suggestions, the at least configuration file specifying contents of the user interface presentation to be generated based at least in part upon the one or more non-binding suggestions.

\* \* \* \* \*